(12) United States Patent
Brodsky et al.

(10) Patent No.: US 10,013,331 B2
(45) Date of Patent: Jul. 3, 2018

(54) CORRELATING QUERIES ISSUED BY APPLICATIONS WITH THEIR SOURCE LINES AND ANALYZING APPLICATIONS FOR PROBLEM DETERMINATION AND WHERE USED ANALYSIS

(71) Applicant: International Business Machines Corporation, Armonk, NY (US)

(72) Inventors: Stephen A. Brodsky, Los Gatos, CA (US); Zeus O. Courtois, San Jose, CA (US); Tom W. Jacopi, San Jose, CA (US); Michael Y. Kwong, San Jose, CA (US); Tony K. Leung, San Jose, CA (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 14/663,930

(22) Filed: Mar. 20, 2015

(65) Prior Publication Data

US 2015/0227450 A1 Aug. 13, 2015

Related U.S. Application Data

(62) Division of application No. 12/495,669, filed on Jun. 30, 2009, now Pat. No. 9,020,939.

(51) Int. Cl.
*G06F 17/30* (2006.01)
*G06F 11/36* (2006.01)
(Continued)

(52) U.S. Cl.
CPC ............ *G06F 11/3624* (2013.01); *G06F 8/75* (2013.01); *G06F 9/547* (2013.01);
(Continued)

(58) Field of Classification Search
CPC .. G06F 11/3612; G06F 17/30477; G06F 8/75; G06F 9/547; G06F 11/3636; G06F 11/3624
See application file for complete search history.

(56) References Cited

U.S. PATENT DOCUMENTS 5,226,162 A * 7/1993 Daw .................... G06F 9/44
703/22
5,442,740 A 8/1995 Parikh
(Continued)

OTHER PUBLICATIONS

Goldsmith, S., R. O'Callahan, and A. Aiken, "Relational Queries Over Program Traces", Proceedings of the 20th Annual ACM SIGPLAN Conference on Object-oriented Programming, Systems, Languages, and Applications, 2005 ACM, pp. 385-402.
(Continued)

*Primary Examiner* — Shiow-Jy Fan
(74) *Attorney, Agent, or Firm* — Janaki K. Davda; Konrad, Raynes, Davda & Victor LLP

(57) ABSTRACT

Provided are techniques for invoking with a processor executing on a computer a source code parser to obtain source information that includes a first location of an Application Programming Interface (API) call and parameters of the API call in source code of a client application, where the parameters the API call do not include query text for a query that is to be used to access a database; examining a stack trace to determine a second location of the API call in the stack trace; and deriving the query of the API call and a third location of the query in the source code by identifying the query in the stack trace at the location of the API call in the stack trace.

12 Claims, 29 Drawing Sheets

(51) Int. Cl.
*G06F 8/75* (2018.01)
*G06F 9/54* (2006.01)

(52) U.S. Cl.
CPC ...... *G06F 11/3612* (2013.01); *G06F 11/3636* (2013.01); *G06F 17/30477* (2013.01)

(56) References Cited

U.S. PATENT DOCUMENTS

| | | | |
|---|---|---|---|
| 5,778,230 A * | 7/1998 | Wimble | G06F 11/3664 714/38.13 |
| 6,341,288 B1 | 1/2002 | Yach et al. | |
| 6,587,995 B1 * | 7/2003 | Duboc | G06F 11/261 703/16 |
| 7,392,246 B2 | 6/2008 | Bhaghavan et al. | |
| 7,430,549 B2 | 9/2008 | Zane et al. | |
| 7,971,255 B1 | 6/2011 | Kc et al. | |
| 9,020,939 B2 | 4/2015 | Brodsky et al. | |
| 2002/0199172 A1 | 12/2002 | Bunnell | |
| 2003/0056192 A1 | 3/2003 | Burgess | |
| 2003/0079159 A1 * | 4/2003 | Ten-Hove | G06F 11/362 714/34 |
| 2003/0233634 A1 * | 12/2003 | Carrez | G06F 11/3664 717/124 |
| 2004/0078689 A1 | 4/2004 | Knuutila et al. | |
| 2005/0262041 A1 | 11/2005 | Beust et al. | |
| 2006/0190923 A1 | 8/2006 | Jubran | |
| 2006/0248514 A1 | 11/2006 | Messmer et al. | |
| 2008/0065593 A1 | 3/2008 | Minder et al. | |
| 2008/0104580 A1 | 5/2008 | Wilkinson | |
| 2008/0178155 A1 * | 7/2008 | Gogh | G06F 11/3664 717/125 |
| 2008/0222708 A1 | 9/2008 | Bhaghavan et al. | |
| 2008/0244531 A1 | 10/2008 | Schmelter et al. | |
| 2008/0320247 A1 * | 12/2008 | Morfey | G06F 1/24 711/154 |
| 2009/0178031 A1 * | 7/2009 | Zhao | G06F 8/427 717/143 |
| 2009/0222429 A1 * | 9/2009 | Aizenbud-Reshef | G06F 8/36 |
| 2009/0287729 A1 | 11/2009 | Chen et al. | |
| 2009/0320002 A1 * | 12/2009 | Peri-Glass | G06F 8/38 717/131 |
| 2010/0162212 A1 * | 6/2010 | Stall | G06F 11/3664 717/124 |
| 2010/0287214 A1 | 11/2010 | Narasayya et al. | |
| 2010/0332473 A1 | 12/2010 | Brodsky et al. | |

OTHER PUBLICATIONS

IBM Corp., "Developing Applications that Use the PureQuery API", [online], [Retrieved on Jun. 23, 2009]. Retrieved from the Internet at <URL: http://publib.boulder.ibm.com/infocenter/idm/v2r1/topic/com.ibm.datatools.javatool.runtime.doc/topics/cpdqruntop.html>, 4 pp.

Juillerat, N., "Enforcing Code Security in Database Web Applications Using Libraries and Object Models", Proceedings of the 2007 Symposium on Library-Centric Software Design, 2007 ACM, pp. 31-41.

Martin, M., B. Livshits, and M.S. Lam, "Finding Application Errors and Security Flaws Using PQL: a Program Query Language", Proceedings of the 20th Annual ACM SIGPLAN Conference on Object-oriented Programming, Systems, Languages, and Applications, 2005 ACM, pp. 365-383.

The Eclipse Foundation, "Eclipse Home Page", [online], © 2009, [Retrieved on Jun. 23, 2009]. Retrieved from the Internet at <URL: http://www.eclipse.org/>, 5 pp.

Office Action 1, dated Sep. 14, 2011, for U.S. Appl. No. 12/495,669, filed Jun. 30, 2009 by S.A. Brodsky et al. Total 17 pp. [57.179 (OA1)].

Response to Office Action 1, dated Dec. 6, 2011, for U.S. Appl. No. 12/495,669, filed Jun. 30, 2009 by S.A. Brodsky et al. Total 10 pp. [57.179 (ROA1)].

Final Office Action 1, dated Jan. 19, 2012, for U.S. Appl. No. 12/495,669, filed Jun. 30, 2009 by S.A. Brodsky et al. Total 13 pp. [57.179 (FOA1)].

Response to Final Office Action 1, dated May 17, 2012, for U.S. Appl. No. 12/495,669, filed Jun. 30, 2009 by S.A. Brodsky et al. Total 10 pp. [57.179 (RFOA1)].

Office Action 3, dated Sep. 4, 2014, for U.S. Appl. No. 12/495,669, filed Jun. 30, 2009 by S.A. Brodsky et al. Total 11 pp. [57.179 (OA3)].

Response to Office Action 3, dated Dec. 4, 2014, for U.S. Appl. No. 12/495,669, filed Jun. 30, 2009 by S.A. Brodsky et al. Total 12 pp. [57.179 (ROA3)].

Notice of Allowance, dated Dec. 23, 2014, for U.S. Appl. No. 12/495,669, filed Jun. 30, 2009 by S.A. Brodsky et al. Total 7 pp. [57.179 (NOA)].

* cited by examiner

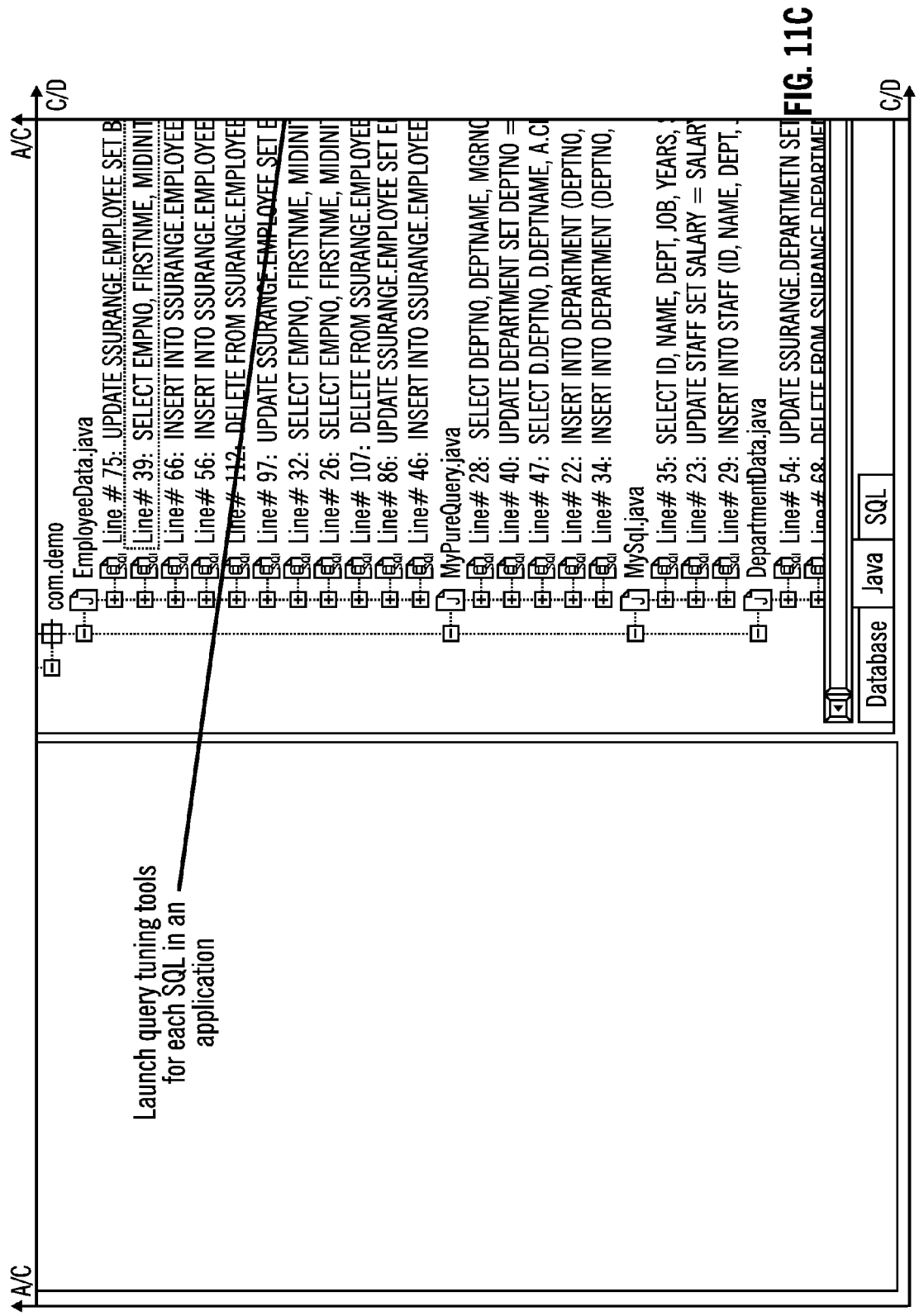

CORRELATING QUERIES ISSUED BY APPLICATIONS WITH THEIR SOURCE LINES AND ANALYZING APPLICATIONS FOR PROBLEM DETERMINATION AND WHERE USED ANALYSIS

BACKGROUND

1. Field

Embodiments of the invention relate to correlating queries issued by applications with their source lines and analyzing applications for problem determination and where used analysis.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

An RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple rows and multiple columns.

Database applications (also referred to herein as "client applications") in an enterprise implement business logic and interact with data stored in databases. Up to now, how the database applications interact with the databases remains in the hands of a database application developer responsible for coding the database applications (i.e., to develop database source code). In a more rigorous environment, there are models that describe both the data and the database applications. A logical model may be produced that describes the data as the business sees the data, while a physical model may be produced that describes the data as stored. Further, an application model may be produced that documents the interaction between the database application and either the logical model or the physical model. These models serve to describe how the database application interacts with the data used by the business. Developers tasked with maintaining the database applications rely on these models to understand how the database applications are impacted as the database changes. Database administrators (DBAs) also rely on these models to optimize the database based on how the data is being used. More often than not, such application models are either out of date or incomplete. This makes the task of maintaining database applications difficult.

If a change to a database is required for some database applications, such as altering some of the database objects (e.g., tables and columns) or database schemas or adding new database objects or database schemas within the database, it becomes difficult to determine which database applications are affected and to determine the cost of modifying the database applications to use the changed or new database objects or database schemas. Such roadblocks often lead to database tables that reflect the need to minimize the impact to existing database applications rather than to reflect the needs of the business. Such databases become difficult to maintain and understand as the business needs evolve.

Thus, there is a need for a better way of gathering information about running database applications to make it easier for developers to understand how the database applications make use of the database and the extent of changes to be made to the database applications to use a different database schema.

Today, database application developers and DBAs face numerous pain points when trying to isolate poorly performing queries (e.g., SQL statements) or trying to determine the queries being issued against the database for audit purposes. Finding and making the correlation between the queries and the related JAVA® source code (of a JAVA® application, which may also be referred to as a JAVA® database application) is tedious and time-consuming (JAVA is a trademark of Sun Microsystems in the United States, other countries, or both). Often the way to understand how the database application accesses the database is to gather all the queries issued by the database application. It is especially burdensome when DBAs see problematic queries issued against the database and have to get help to find the database application that issued the problematic queries.

Correlating queries executed on the database to the actual lines of code triggering the queries includes gathering and wading through stack traces from database drivers and different data access components accessed by the database application. The process is repeated every time any problem occurs in the database application. The ability to correlate depends on the underlying components to provide appropriate stack traces and is a continuous burden on developers to add stack traces and keep them correct.

The DBA is also limited in identifying what JAVA® classes were issuing the queries due to the limited information found in the stack traces. Because the developers choose JAVA Database Connectivity (JDBC®) or a JDBC®-based framework, the DBA has limited tools to help the developer know what database applications the queries are coming from (JDBC is a trademark of Sun Microsystems in the United States, other countries, or both).

The correlation gets more complex with three-tier architectures and when frameworks are used. A three tier architecture may be described as further refining a client-server architecture into three separate layers: presentation, business logic, and data storage. The three tier architecture is different from a traditional two tier model in which the business logic and presentation layers are combined into a client layer. Applications using frameworks, such as a HIBERNATE® framework (which is an Object Relational Mapping (ORM) framework for JAVA® applications) or a JAVA® Persistence API (JPA) framework, generate queries on the fly, and it is difficult for the developer to trace back a particular query (or set of queries) to the query language of the framework that generated the query, even when the JAVA® source code is available (HIBERNATE is a trademark of Red Hat, Inc. Software Foundation in the United States, other countries, or both). When the JAVA® source code is not available, it is even more difficult. Therefore, if an end user, developer, or DBA complains about a poorly performing query, it may be a large effort to try and locate that query in the originating JAVA® source code.

In addition, there is no easy way to gain insight into which database objects were referenced by which parts of a JAVA® application. Team members working on different parts of the database application do not have a way to gain insight into what queries the other parts of the database application would be issuing to the database. Developers do not have information about all the queries issued by a certain JAVA® class. In addition, on the database side, schemas are continuously changing as part of the database application development process. The inability to gain insight into how much the change would impact the database application makes such changes risky. Developers and DBAs cannot easily work together to understand the impact of such changes. Because of this, the complicated process of determining the impact of a change slows down development, resulting in delays for delivering a final product, or perhaps even resulting in the decision not to make changes because of such delays.

Thus, there is need for understanding the relationship between queries and their source code for both DBAs and developers alike.

BRIEF SUMMARY

Provided are a method, computer program product, and system for invoking with a processor executing on a computer a source code parser to obtain source information that includes a first location of an Application Programming Interface (API) call and parameters of the API call in source code of a client application, where the parameters of the API call do not include query text for a query that is to be used to access a database; examining a stack trace to determine a second location of the API call in the stack trace; and deriving the query of the API call and a third location of the query in the source code by identifying the query in the stack trace at the location of the API call in the stack trace.

Provided are a method, computer program product, and system for setting, with a processor executing on a computer, one or more breakpoints in source code of a client application based on locations of Application Programming Interface (API) calls in the source code; and, while running the client application through a debugger, upon reaching each of the one or more breakpoints, identifying one or more debugger rules associated with a query at a breakpoint; in response to determining that conditions of the one or more debugger rules are satisfied, obtaining a stack trace before the query makes a call to a database; and deriving query text of the query and a location of the query in source code of the client application.

Provided are a method, computer program product, and system for retrieving the correlator results and generating user interface views using the correlator results, wherein the user interface views provide at least one of: a view showing the query in the database and the query in the source code, a view showing database schemas and database objects that the query uses, a view showing queries per class, a view showing the queries used by each database object in the database, a view showing how queries are run, a view for exporting data, and a view showing performance information of execution count and execution time for each of the queries.

BRIEF DESCRIPTION OF THE SEVERAL VIEWS OF THE DRAWINGS

Referring now to the drawings in which like reference numbers represent corresponding parts throughout:

FIG. 8 illustrates a user interface view showing database schemas and database objects that a query uses in accordance with certain embodiments.

FIG. 9 illustrates a user interface view showing queries used by each database object in accordance with certain embodiments.

FIGS. 11A, 11B, 11C, and 11D illustrate a user interface view showing the performance of a query with a "Launch Visual Explain" menu in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
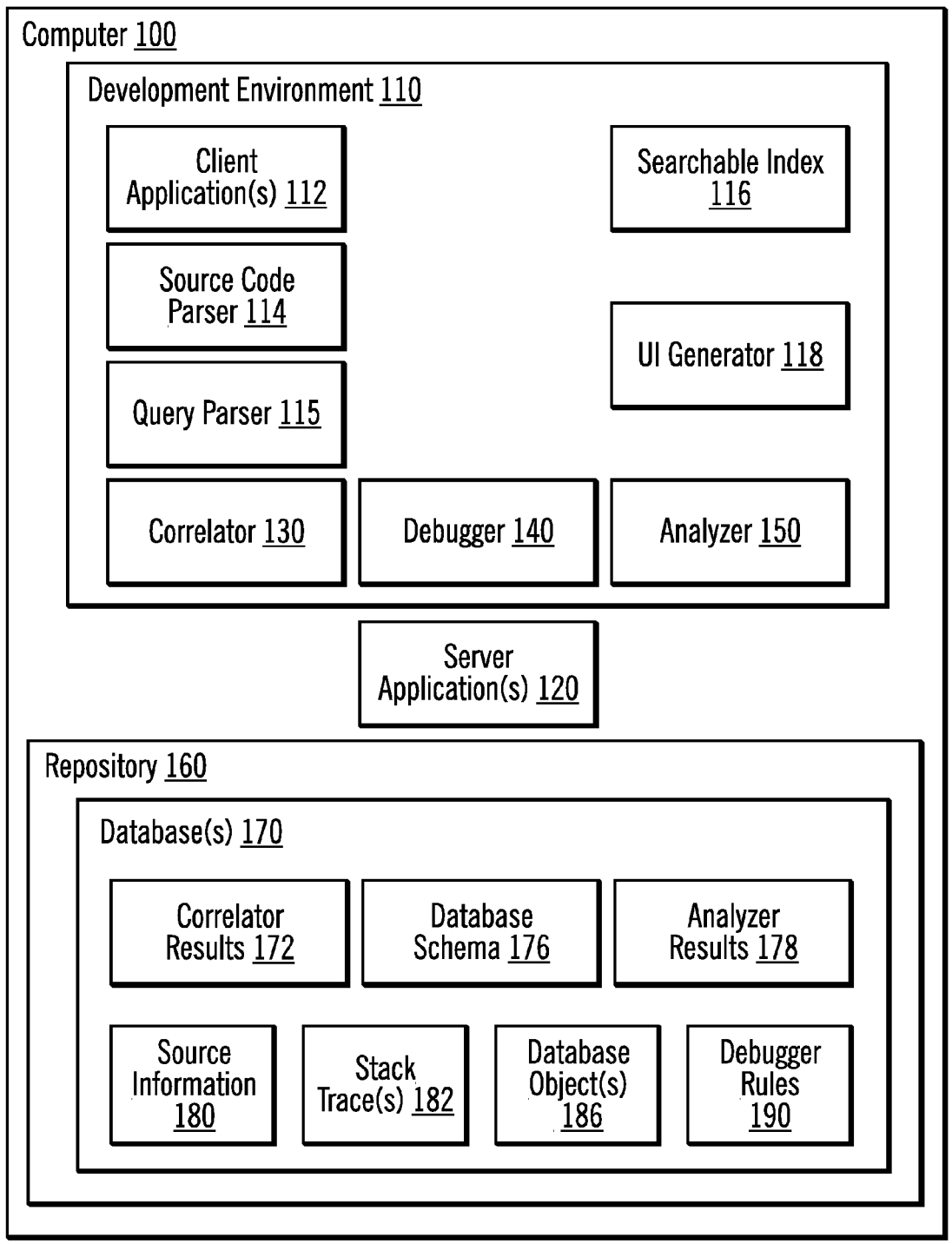
FIG. 1 illustrates, in a block diagram, a computing environment in accordance with certain embodiments of the invention.

FIG. 1 illustrates, in a block diagram, a computing environment in accordance with certain embodiments of the invention. A computer 100 includes a repository 160. The computer 100 includes a development environment 110 and one or more server applications 120. The development environment 110 is coupled to the repository 160. The development environment 110 includes one or more client applications 112, a source code parser 114, a searchable index 116, and a User Interface (UI) generator 118. The source code parser 114 parses the source code of each client application 112 and stores locations of Application Programming Interface (API) calls in the searchable index 116. Client applications 112 use a set of known access techniques to issue queries against the database 170. These access techniques, commonly referred to database access API calls or APIs, are well known in the programming community. For example, a well known set of database access API calls for JAVA® applications, known as JDBC® API calls, have a well defined set of classes and methods to gain access to data in the database 160. The source code parser 114 makes use of knowledge of the API calls to find the locations within the source code of each client application 112 where such API calls are used.

Although the client applications 112 and server applications 120 are shown at the same computer 100, the client applications 112 may execute at a different computer coupled to computer 100. In certain embodiments, client applications 112 are database applications. Each client application 112 may be said to be implemented from source code in a high level programming language (e.g., the JAVA® programming language or the C++ programming language).

The development environment 110 includes a query parser 115. The query parser 115 breaks up a query into individual parts (e.g., columns and tables) to gain understanding of database tables and columns referenced by the query.

The repository 160 that stores data of the client applications 112 includes one or more databases 170. The database 170 also stores correlator results 172 (generated by the correlator 130), analyzer results 178 (generated by the analyzer 150), one or more database schema 176, source information 180, one or more stack traces 182, one or more database objects 186 (e.g., tables and columns) and debugger rules 190. A stack trace 182 may be generated by running a client application 182 through the debugger 140 or using another tool that generates the stack trace.

The development environment 110 includes a correlator 130 that correlates queries issued by client applications 112 with their source lines in the source code. The correlator 130 analyzes the source code to identify source information 180 (e.g., locations of API calls in the source code that access the database) and stack traces 182 of execution of the source code to correlate queries issued by the API calls with the location of the API calls in the source code. The source information 180 includes the API calls and the locations of the API calls in the source code. In certain embodiments, the source information 180 includes, for each API call, a file name, a line number, the API call, and parameters for the API call. If a parameter is a full query, the source information 180 also includes the query. If a parameter is a program expression that would result in a query during runtime, the source information 180 does not have the complete query. The stack trace 182 may be said to include stack information including the API call, parameters of the API call, and the application call path. An application call path details how the API is called within the client application 112. For example, if within a client application 112, function A calls function B, which then calls the API, the stack trace 182 includes information about function A, function B, and the API call.

The development environment 110 also includes a debugger 140. The debugger 140 uses the source information 180 to generate breakpoints in the source code and uses debugger rules 190 to determine at what point after a breakpoint to take a copy of the stack trace 182 while running the client application 112. A stack trace may be described as a collection of information that indicates where an invocation of an API call originates in the source code.

The development environment includes an analyzer 150. The analyzer 150 analyzes the client application 112 for problem determination and where used analysis ("where used" analysis may be described as referring to a process that determines where a database table or database column is being used in the client applications 112).

The repository 160 may comprise an array of storage devices, such as Direct Access Storage Devices (DASDs), Just a Bunch of Disks (JBOD), Redundant Array of Independent Disks (RAID), virtualization device, etc.

Embodiments analyze how queries access database objects 186 and deduce the relationship between the database objects 186 and source code, thus providing insight into how different client applications make use of the database objects.

There are different ways to gain insight into a running client application 112. In certain embodiments, the client application 112 is written using database access API calls, and no changes are made to the existing client application 112 to work with the correlator 130 and the debugger 140. That is, embodiments describe techniques for handling existing client applications 112 without changing the source code of the client applications 112 (e.g., without adding new API calls to the source code). Certain embodiments of the correlator 130 and debugger 140 focus on client applications 112 that use the JAVA® programming language, but embodiments apply to any programming language (including procedural programming languages).

Merely to enhance understanding, an example will be provided to show how the correlator 130 generates correlator results 172. Some development environments have built-in parsers for the source code.

For example, the source code parser 114 in the development environment 110 outputs a searchable index 116 identifying where API calls to the database 170 are used in the source code. The correlator 130 constructs a query to find the locations in the source code where the API calls to the database 170 are used. For JDBC® applications, the correlator 130 looks for the API calls listed in Set A in the searchable index 116 (and these API calls may also be referred to as methods):

Set A
java.sql.Connection::prepareStatement
java.sql.Connection::prepareCall
java.sql.Connection::nativeSQL
java.sql.Statement::execute
java.sql.Statement.addBatch
java.sql.Statement::executeQuery
java.sql.Statement::executeUpdate The API calls listed in Set A are the calls a JAVA® application may make to issue queries against the database 170. In certain embodiments, by locating the source code location where the API calls are made and by examining the source lines, the correlator 130 is able to determine the query calls made by the client application 112 to the database 170. For example, the correlator 130 might find the following source code, Code A:

Code A
stmt=connection.prepareStatement("SELECT FIRSTNME, LASTNAME from EMPLOYEE");

The correlator 130 may use a search function to locate Code A using the searchable index 116 as something to do with the call to java.sql.Connection::prepareStatement. With this information, the correlator 130 jumps directly to the line in the source code at which the API call is made, and the correlator 130 invokes the source code parser 114 to parse Code A to obtain Query A issued by the client application 112 at this line:

Query A
SELECT FIRSTNME, LASTNAME from EMPLOYEE

Query A selects data from the FIRSTNME and LASTNAME columns from an EMPLOYEE table. The correlator 130 has Query A issued by the client application 112 and the source information 180 identifying the location in the source code of the API call for Query A. In some embodiments, the correlator 130 is then able to identify that Query A is called from the location in the source code of the API call. The correlator 130 stores correlator results 172 in the repository 160. The correlator results include the query, tables and columns used in the query, and the location in the source code where the query is used. In certain embodiments, the correlator 130 invokes the query parser 115 to parse the query and to determine the tables and columns used in the query. That is, the correlator 130 may also invoke the query parser 115 to parse the query so as to understand the database objects 186 used by the query. For Query A, the query parser 115 informs the correlator 130 that Query A uses columns FIRSTNME and LASTNAME from the table EMPLOYEE. The correlator 130 then stores the source code location, including line number, the query, and that the query makes use of the FIRSTNME and LASTNAME columns into the repository 160 for further analysis.

In such cases, whenever there is a change request for the EMPLOYEE table, the FIRSTNME column or the LASTNAME column, the repository 160 may be queried to gather dependency information for the client application 112 that makes use of the FIRSTNME and LASTNAME columns or the table EMPLOYEE. The dependency information for a query identifies tables and columns used by the query. For the query to run properly, a particular table and columns may be referenced, and so the query is said to be dependent on the particular table and columns that the query references. The dependency information from the repository 160 may be used to direct developers to the source code line that issues the query. The developer may then accurately assess the impact of the proposed change to the client application 112.

Sometimes, the source code at the location of the API call may not have enough information to enable the correlator 130 to derive the query used. For example, the following is Source Line A:

Source Line A
ResultSet resultSet=statement.executeQuery("SELECT "+getColumns( )+getTable( );

With Source Line A, the query statement is not available until the client application 112 is run and the functions getColumns( ) and getTable( ) are called to complete the query statement. The correlator 130 cannot just use the source information 180 to identify the query. Therefore, an alternative is used to capture the query used by the client application 112 when the client application 112 runs (i.e., executes). The correlator 130 knows that the "executeQuery" API call is located at line 85 of the source code (from the source information 180). In certain embodiments, by installing a wrapper around the JDBC® connection used to issue the query, correlator 130 may capture a snapshot of the stack trace as the client application 112 issues a call to the database 170. For example, the correlator 130 captures Stack Trace A shown in the form of an Extensible Markup Language (XML) fragment:

---
Stack Trace A
---

```
<prepareSql>SELECT DEPTNO, DEPTNAME, MGRNO, ADMRDEPT,
LOCATION FROM DEPARTMENT</prepareSql>
   <traceInfo>
      <traceEntry classFile="StatementProxyHandler"
         containingPkg="com.ibm.pdq.runtime.internal.wrappers.db2"
         fileName="Unknown Source" isNative="false" lineNo=""
            method="executeQuery"/>
      <traceEntry classFile="DepartmentJDBCSample"
         containingPkg="database"
         fileName="DepartmentJDBCSamplejava" isNative="false"
         lineNo="85"
            method="run2"/>
      <traceEntry classFile="DepartmentJDBCSample"
         containingPkg="database" fileName="DepartmentJDBCSamplejava"
            isNative="false" lineNo="19" method="main"/>
   </traceInfo>
```

Stack Trace A describes an API that has a parameter of a query statement identified by the prepareSQL XML element. Stack Trace A furthers identifies the API call originating at line 19 within the DepartmentJDBCSample source file, calling line 85 within the same DepartmentJDBCSample.java file, and finally ending within an unknown file making a call to executeQuery.

After the correlator 130 has used source code parser 114 that parses the client application 112 that includes Source Line A at line 85 within source file DepartmentJDBCSample.java, the correlator 130 searches through the stack traces 182 stored in the repository 160 for matches to line 85 of file DepartmentJDBCSample.java. Upon finding the entry within Stack Trace A, the correlator 130 associates the query "SELECT DEPTNO, DEPTNAME, MGRNO, ADMRDEPT, LOCATION FROM DEPARTMENT" with the API call at line 85. By combining information gathered from source code parser 114 and the stack trace 182, the correlator 130 is able to derive the query statement issued by Source line A.

Thus, within the stack trace 182, the correlator 130 may derive that the query issued by the API call goes through the path of source line 19 to source line 85 and ends up at a class called StatementProxyHandler when the client application 112 finally issues the "executeQuery" API call. The correlator 130 further processes the query and the stack trace to generate the dependency information after the query has been captured. This dependency information is stored in the repository 160 as correlator results 172. Then, a developer (or other user) may retrieve the correlator results 172 to understand how the DEPARTMENT table is being used by the client application 112.

The above Stack Trace A also illustrates a need to further narrow the stack trace 182 to eliminate information unrelated to the client application developer, such as internal classes used by other vendors that the client application developer has no access to. For example, it may be seen from the class package "com.ibm.pdq.runtime.internal.wrappers.db2" that the client application query does not originate from this class. Embodiments introduce a mechanism of filtering to remove noise from the stack trace 182. By comparing the package names with some known package names that may be filtered, the correlator 130 may reduce the noise in the stack trace. For example, by registering to the correlator 130 that package names starting with com.ibm are to be removed, the correlator 130 may reduce the stack trace to Stack Trace B:

---
Stack Trace B
---

```
<traceInfo>
   <traceEntry classFile="DepartmentJDBCSample"
      containingPkg="database"
      fileName="DepartmentJDBCSamplejava" isNative="false" lineNo=
      "85"
         method="run2"/>
   <traceEntry classFile="DepartmentJDBCSample"
      containingPkg="database" fileName="DepartmentJDBCSamplejava"
         isNative="false" lineNo="19" method="main"/>
</traceInfo>
```

In certain embodiments, while the correlator 130 is able to remove some (e.g., well-known) packages from the stack trace, there are still stack traces within the client application 112 that cannot be reduced further since they all share the same package. In certain embodiments, drilling deeper into removing classes may not help with intra-class calls.

Since the API call comes from the client application 112, the stack trace contains entries from within the client application 112. By looking at the stack trace information along with the API locations from the source code parser 114 output, embodiments extract from the stack trace the location in the source code where the query calls takes place, eliminating all the other entries that are unrelated to the application. Thus, by intersecting the source information 180 and the stack trace information, the correlator 130 pinpoints the location in the source code where the query call takes place. The intersection between the stack trace information and the source information 180 provides the locations of the query calls.

In certain embodiments, the correlator 130 does not just examine the class names with use of the stack trace to find the location because, at least for JAVA® calls, java.sql.Connection is an interface name, and the stack trace contains information about the class that implements the interface without providing the interface name. For example, the following is Stack Trace C:

---
Stack Trace C
---
traceEntry classFile="StatementProxyHandler"
   containingPkg="com.ibm.pdq.runtime.internal.wrappers.db2"
   fileName="Unknown Source" isNative="false" lineNo=""
   method="executeQuery"/>

---

In Stack Trace C, the target of the executeQuery API call is a class called StatementProxyHandler, not java.sql.Connection. Without the interface name in the stack trace 182, it is not possible to identify java.sql.Connection from the stack trace 182. By intersecting the source information 180 with the stack trace information, the correlator 130 reveals the JAVA® interface of the target (StatementProxyHandler).

Figure 2:
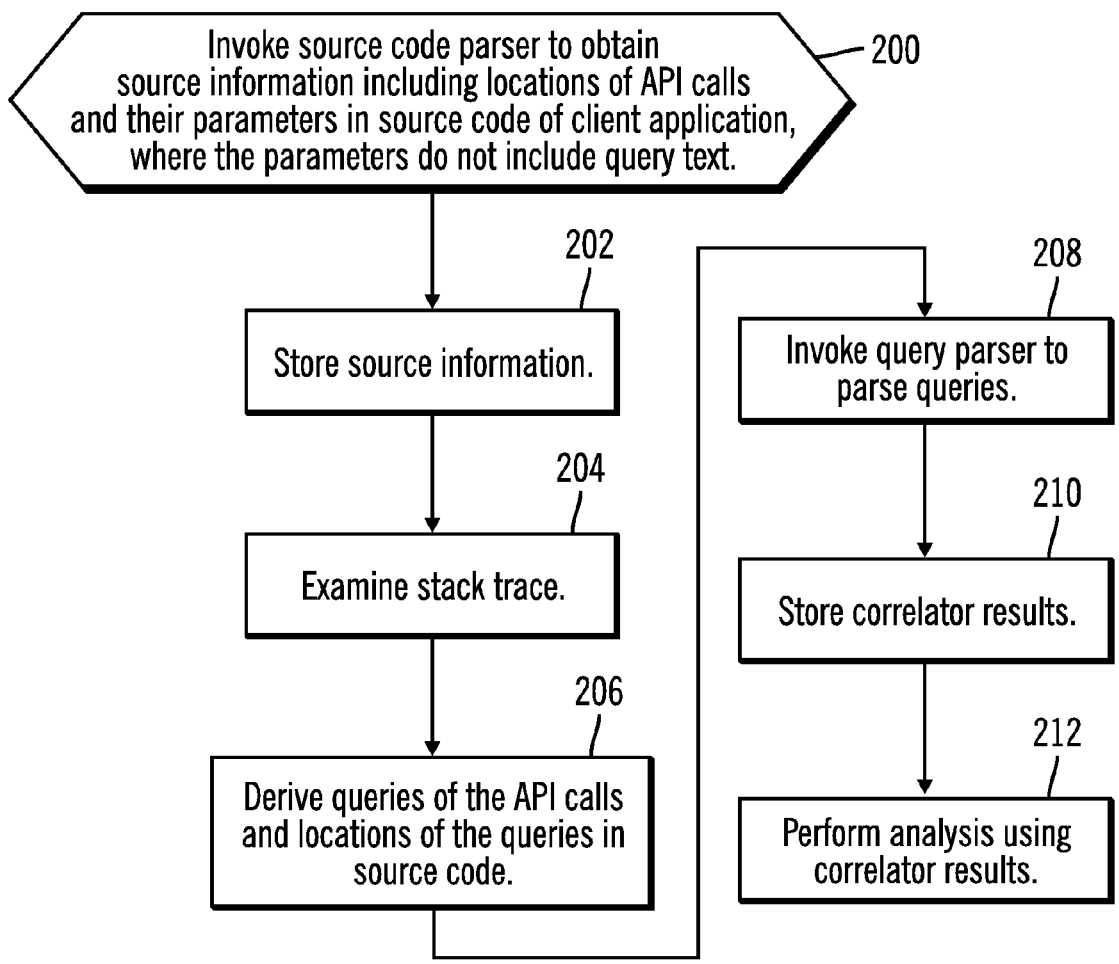
FIG. 2 illustrates logic performed by a correlator using source information and a stack trace to gather data to understand how a client application accesses a database in accordance with certain embodiments.

FIG. 2 illustrates logic performed by the correlator 130 using source information 180 and a stack trace 182 to gather data to understand how the client application 112 accesses the database 170 in accordance with certain embodiments. Control begins at block 200, in which the correlator 130 invokes the source code parser 114 to obtain source information 180, including locations of API calls in the source code of the client application 112 and the parameters of these API calls, where the parameters do not include the query text for a query that is to be used to access the database 170. Some existing client applications 112 use a standard set of API calls to access the database 170. For example, many JAVA® applications use a JAVA® Database Call (JDBC®) API to access the database 170. After the source code parser 114 parses the client application 112 and records the locations in which API calls to the database 170 are used, the correlator 130 gathers the set of locations in the client application 112 where interactions (i.e., the API calls) with the database 170 take place.

In block 202, the correlator 130 stores source information 180 in the repository 160. In certain alternative embodiments, the source code parser 180 may store the source information 180.

In block 204, the correlator 130 examines the stack trace 182 to identify locations of the API calls in the stack trace. The correlator 130 has the locations of the API calls in the source information 180. Then, the correlator 130 examines the stack trace 182 whenever a call to the database 170 happens. Then, by examining the stack trace 182 of the client application 112 during the API call, the correlator 130 determines information about the path the client application 112 has taken to issue the API call. Information about the path the client application 112 takes to the database provides a pointer to a location in the client application 112 at which the API call is made and where changes may be made to use a different database schema 176 or database objects.

In block 206, the correlator 130 derives query text of the queries (e.g., SQL statement text, such as a SELECT statement) issued by the API calls and the locations of the queries in the source code by identifying the queries in the stack trace at the locations of the API calls in the stack trace. In particular, the correlator 130 uses an intersection of the locations of the API calls and paths from stack trace that identify locations of API calls to identify the queries. In block 208, the correlator 130 invokes the query parser 115 to parse the queries to identify database objects. In block 210, the correlator 130 stores correlator results 172 in the repository 160. In certain embodiments, for each API call, the correlator results 172 identify the source file of the client application 112, source code location (i.e., line number) where the API call occurs in the source code, and parameters of the API call, where one of the parameters is the query text. The correlator results 172 may also include the database objects 186 which the query makes use of. In block 212, analysis may be performed on the correlator results 172 by, for example, the analyzer 150. In certain embodiments, the analysis of block 212 includes retrieving the correlator results 172 and providing user interface views to allow analysis of the correlator results 172.

In certain embodiments, the correlator 130 generates correlator results 172 by running the client application 112 through the debugger 140. When the client application 112 is run in the debugger 140, the debugger 140 retrieves the stack trace information for each API call. The debugger examines the stack trace 182 prior to the API call to the database 170 to gather information about the client applications 112 for further analysis. The information gathered includes the call stack, parameters used in the API call, and the source file and line number of the API call.

With the debugger 140, source code stack information is revealed on every API call. The debugger 140 sets breakpoints in the source code based on the source information 180 to stop on every API call to the database 170 to take the stack trace information. The debugger 140 gathers correlator results 172 (i.e., information) similar to the information generated by intersecting the source information and the stack trace information.

Consider the API call in Source Line A (which is repeated here for ease of reference):

Source Line A

ResultSet resultSet=statement.executeQuery("SELECT "+getColumns( )+getTable( );

When the debugger 140 stops at a breakpoint corresponding to the API call in Source Line A, the stack trace 182 does not reveal enough information about the actual query being issued because the construction of the query has not begun yet. In this example, multiple function calls (e.g., getColumns( ) getTable( ) and the concatenation of the strings) have to happen before the API call to executeQuery is made. With embodiments, the debugger 140 does those calls and stops right before the call to executeQuery and then generates a stack trace (i.e., takes a snapshot of the stack).

Embodiments introduce a rule based debugger guidance system to guide the debugger 140 to perform the calls, stop before the call to executeQuery, and take the snapshot. Since a developer knows what the stack should look like when the API call takes place, the developer may establish the debugger rules 190 for the debugger 140. The debugger 140 uses the debugger rules 190 to identify when to stop when conditions in the debugger rules 190 are met. In certain embodiments, many API calls to database 170 are standardized, and the debugger rules 190 for the API calls may be pre-programmed into the debugger 140, saving developers the need to define the debugger rules 190.

In certain embodiments, different types of API calls are associated with different sets of rules. An infrastructure is set up by the debugger 140 to decide which set of rules (or sets of rules) to follow depending on the type of API call in the breakpoint. This allows the debugger 140 to traverse any kind of API call and stop at the desirable location through matching of the stack frame instead of relying on source line numbers.

For example, to find the call before the executeQuery API call, it is known:
  i. The API call is called executeQuery.
  ii. The target class implements the java.sql.Connection interface
  iii. There should be two variables on the stack (first one is the target object, second one should be a string)

By setting these rules, the developer can direct the debugger 140 to step into and return to the breakpoint until the rules are satisfied. When the rules are satisfied, the debugger 140 knows it is stopping right before the actual call to executeQuery is to take place and may record the stack information.

Examples of debugger rules 190 are provided merely to enhance understanding of the embodiments. The following is example Debugger Rule 1:
  Debugger Rule 1
  A JAVA® class that implements the JAVA® interface java.sql.Connection, and executing an API call named prepareStatement, and
  the API call being executed has one parameter, and
  the parameter is of type java.lang.String.

The correlator 130 finds that the Debugger Rule 1 rule is met if the debugger 140 is about to execute the query statement listed in Code A:
  Code A
  stmt=connection.prepareStatement("SELECT FIRSTNME, LASTNAME from EMPLOYEE");

The following is example Debugger Rule 2:
  Debugger Rule 2
  A JAVA class that implements the Java interface java.sql.Statement, and
  executing an API call named executeQuery, and
  the API call being executed has one parameter, and
  the parameter is of type java.lang.String
  Debugger Rule 2 may be used for Source Line A:
  Source Line A
  ResultSet resultSet=statement.executeQuery("SELECT "+getColumns( )+getTable( );

For Source Line A, the correlator 130 guides the debugger 140 to pause, step through the code to call getColumns( ) and getTable( ) (since at that point the parameter type is not java.lang.String yet) until both the getColumns( ) and getTable( ) functions are called and the result concatenated with the "SELECT" string to form the actual string that matches the java.lang.String type. Then the correlator 130 pauses to make a copy of the stack trace and retrieves the parameter.

Embodiments also enhance conditional breakpoints. The debugger 140 may rely on setting the breakpoint based on the source information 180 (e.g., line numbers). In certain embodiments, the debugger 140 allows the use of conditional breakpoints that may be attached to the breakpoints that are based on the source information 180. Some developers (especially developers not familiar with the client application 112) find it difficult to determine where to set these breakpoints.

By automatically locating the locations in which breakpoints may be set using the source information 180 and by attaching rules to these breakpoints, embodiments allow users to set breakpoints based on the query text that they wish to stop at. For example, the following is Query A (which is repeated here for ease of reference):
  Query A
  SELECT FIRSTNME, LASTNAME from EMPLOYEE Beyond the standardized set of debugger rules 190, a developer can also direct the debugger 140 to stop whenever a particular query is encountered (e.g., whenever the particular query is issued from the client application 112). In certain embodiments, the user may establish the rule with a User Interface (UI) gesture or by inputting text that describes the rule. This simplifies the task of setting breakpoints and attaching conditions to the breakpoints. Also, this avoids the developer either missing some areas of the client application 112 or mistyping queries. In particular, with traditional debuggers, the developer manually specifies where the breakpoints are. On the other hand, with the debugger 140, the developer may specify the debugger rules 190 (e.g., "Just stop whenever you see this query") without having to go through the source code and putting down breakpoints. With embodiments, the developer may specify the debugger rules 190 (e.g., using a UI), and the developer avoids manually typing the queries into the debugger 140. Because the debugger 140 has access to the client application 112, the debugger 140 may even stop on a query such as the following Query B by examining the query text and the two parameters being passed in to execute Query B.
  Query B
  INSERT INTO EMPLOYEE (FIRSTNME, LASTNAME) values (?, ?)

Figure 3:
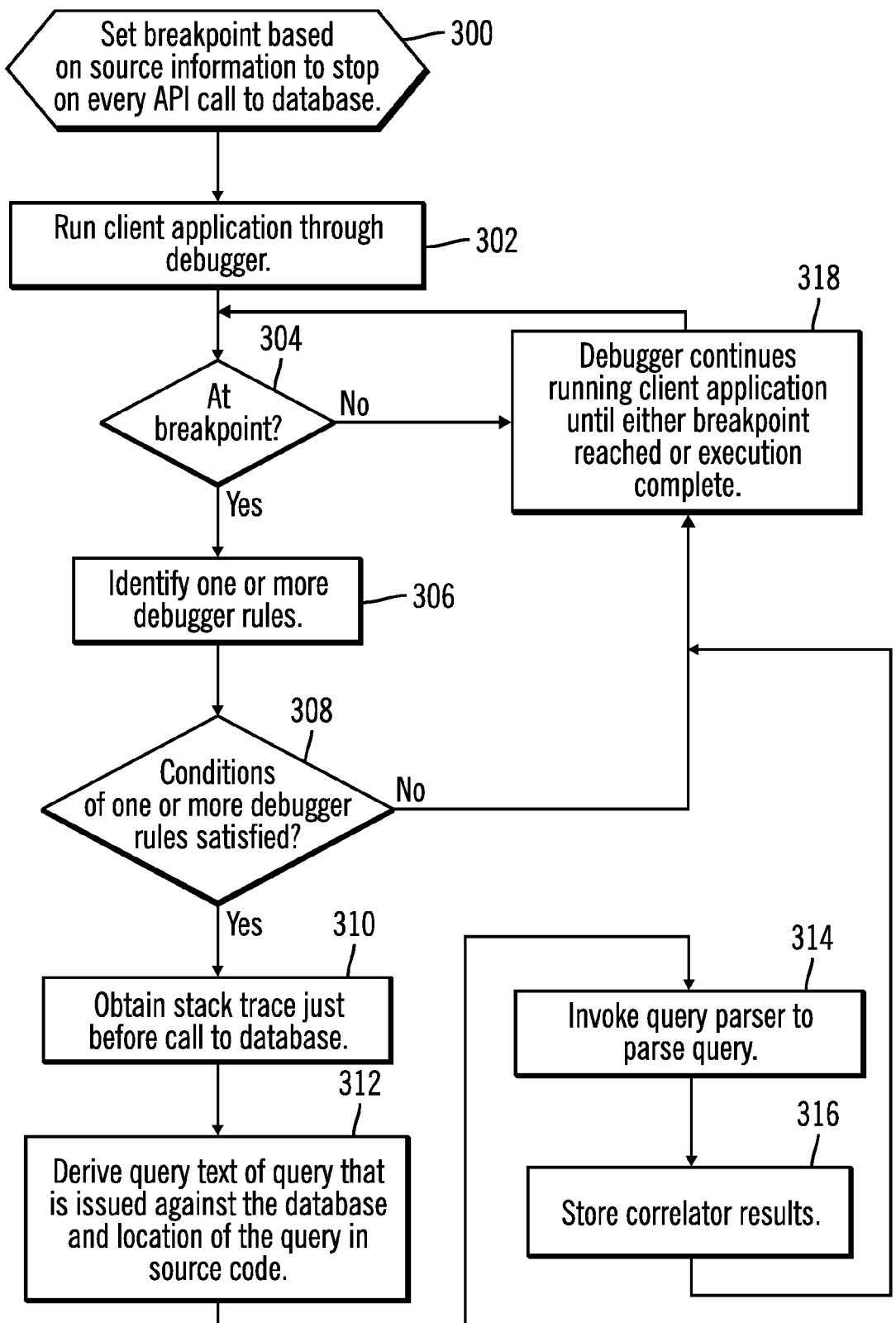
FIG. 3 illustrates logic performed by a correlator using a debugger to gather data to understand how a client application accesses a database in accordance with certain alternative embodiments.

FIG. 3 illustrates logic performed by the correlator 130 using a debugger 140 to gather data to understand how the client application 112 accesses the database 170 in accordance with certain alternative embodiments. Control begins at block 300, with the correlator 130 setting breakpoints based on the source information 180 to stop on every API call to the database 170. In certain embodiments, the correlator 130 obtains the locations of the API calls in the source code from the source information 180 and sets breakpoints at the API calls. In certain alternative embodiments, a developer may set the breakpoints. In block 302, the correlator 130 runs (i.e., executes) the client application 112 through the debugger 140. In block 304, the correlator 130 determines whether a breakpoint has been reached. If so, processing continues to block 306, otherwise, processing continues to block 318.

In block 306, the correlator 130 identifies one or more debugger rules 190. In block 308, the correlator 130 determines whether the conditions of the one or more debugger rules 190 have been satisfied. If so, processing continues to block 310, otherwise, processing continues to block 318. In block 310, once the one or more debugger rules 190 are satisfied, the correlator 130 obtains a stack trace just before a API call to the database 170. In block 312, the correlator 130 derives query text of the query (e.g., SQL statement text, such as a SELECT statement) that is issued against the database 170 and locations of the query in the source code. In block 314, the correlator 130 invokes the query parser 115 to parse the query to identify database objects. In block 316, the correlator 130 stores correlator results 172 that include information from the stack trace. In certain embodiments, for each API call, the correlator results 172 identify the source file of the client application 112, source code location (i.e., line number) where the API call occurs, and parameters, where one of the parameters is the query text. The correlator results 172 may also include the database objects 186 which the query makes use of From block 316, processing continues to block 318.

In block 318, the debugger 140 continues running the client application 112 until either a breakpoint is reached, in which case processing continues to block 304, or the client application 112 execution is complete.

The correlator results 172 gathered by the correlator 130 and debugger 140 are stored in the repository 160 and be used later on for monitoring and problem determination.

Thus, embodiments provide the correlator 130 and the debugger 140 to associate queries with lines of the source code. Such an association may be used to determine the interaction between the client application 112 and the underlying database 170. When the underlying database schema 176 needs to be changed, a developer may quickly use this information to determine how much each client application 112 needs to be changed and the extent of the impact.

Using the searchable index 116, the correlator 130 may locate places in the client application 112 where an interaction with the database 170 takes place. In certain embodiments, by installing a listener on the JDBC® interaction between the client application 112 and the database 170, the correlator 130 obtains stack information during the query call and determines possible locations within the source code where the API calls take place. By using the searchable index 116, the correlator 130 singles out the location from the stack trace where the most relevant source location is for a particular API call.

When running the client application 112 through the debugger 140, a developer is able to provide debugger rules 174 for the debugger 140 to guide the debugger 140 through stepping through the source code, providing precise information about the location of the API call and the call parameters.

The correlator 130 and debugger 140 contribute to enhancing understanding of the client application 112 without having to rely on manual techniques of documentation.

In certain embodiments, the correlator results 172 are stored in a relational form (for ease of query) and are used when a problem occurs. Thus, given a query, embodiments locate the client application 112 that generates this query by searching the repository 160.

The correlator 130 and debugger 140 work on existing client applications 112 without requiring any changes to the client applications 112. Developers may use tools that implement these embodiments for existing client applications 112. The correlator results 172 also reflect the current state of the client applications 112, not any manually written application model or documentation that could be already be outdated by recent undocumented changes. This gives developers accurate knowledge about client applications 112 and enables developers to be confident in making changes to the source code as business needs evolve and database objects 186 change.

Embodiments also provide the analyzer 150 and UI generator 118. The analyzer 150 may be applied to any client application 112 (e.g., a JAVA® database application, using plain JDBC® or a framework, hence the benefits are available to the JAVA® database application developer and DBA community). Certain examples of embodiments of the analyzer 150 focus on client applications 112 that use the JAVA® programming language, but embodiments apply to any programming language (including procedural programming languages).

Embodiments connect the ability to gain insight into the queries in a client application 112, the source code location of the queries, and the database objects 186 that are used by the queries. The analyzer 150 performs a combination of complex analysis to connect this information in a meaningful way that may answer the following Set of Questions:

Set of Questions
1. Where are the one or more queries located in the source code?
2. What are the one or more queries issued by a certain JAVA® class?
3. For each query, what are the database schema 176 and database objects 186 (e.g., tables and columns) that the query uses?
4. For each database schema 176 or table used by the client application 112, what are the one or more queries issued by the client application 112?
5. Does the query execute producing the results as expected?
6. How does the query perform?
7. What are the one or more queries issued by the client application 112?

Typically, deep knowledge of JAVA® client applications and databases is needed to provide such information integrated within a development tool. To make this information available within the development environment, embodiments collect the information before the client application 112 has gone into production (e.g., at development time), as opposed to dependency on stack traces created after client application 112 execution.

Figure 4:
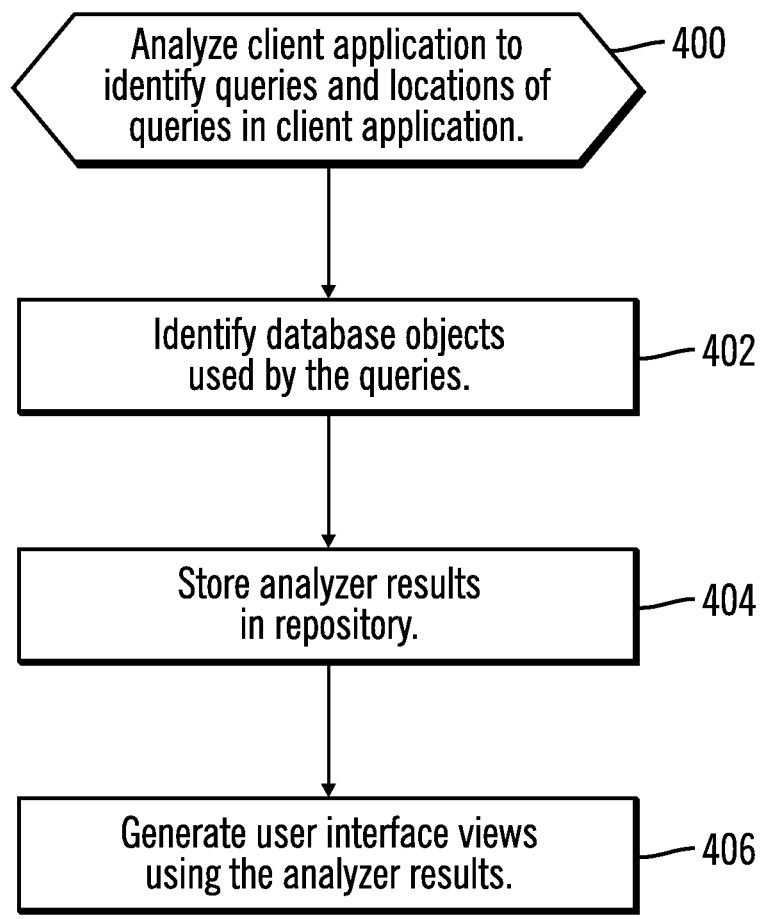
FIG. 4 illustrates logic performed by an analyzer and a UI generator in accordance with certain embodiments.
Figure 5A:
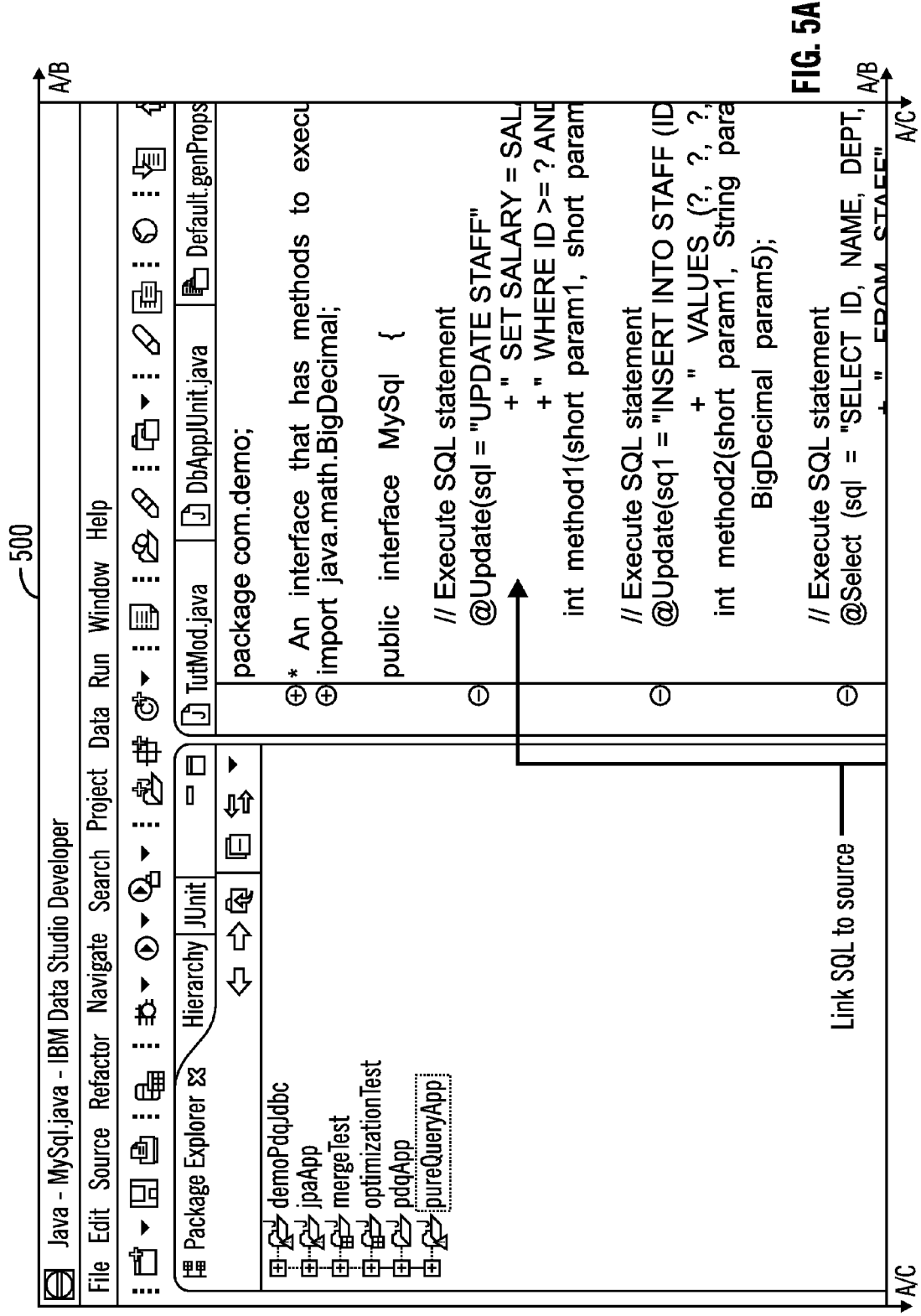
FIGS. 5A, 5B, 5C, and 5D illustrate a user interface view showing linking to a query when using JDBC® in accordance with certain embodiments.
Figure 5B:
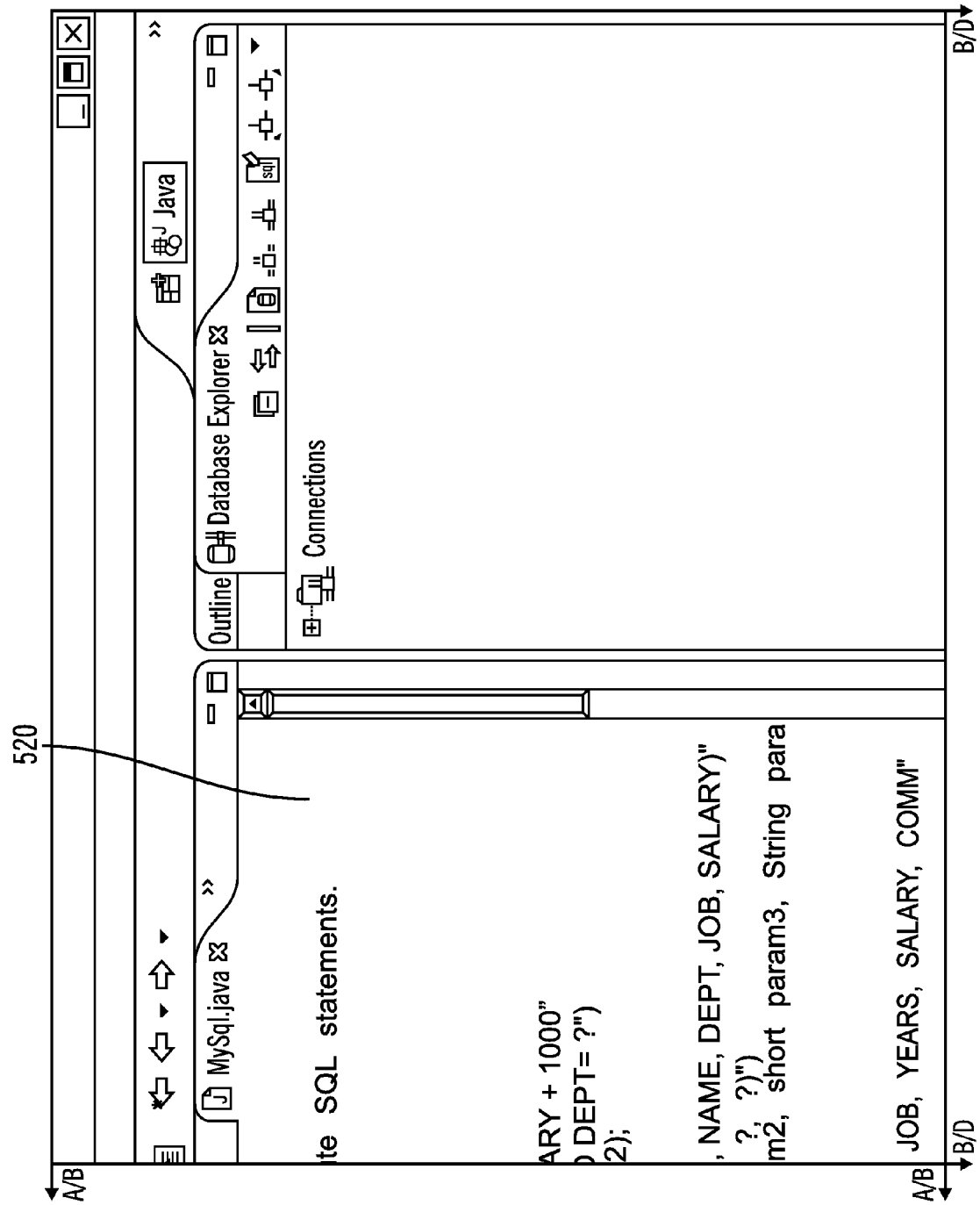
Figure 5C:
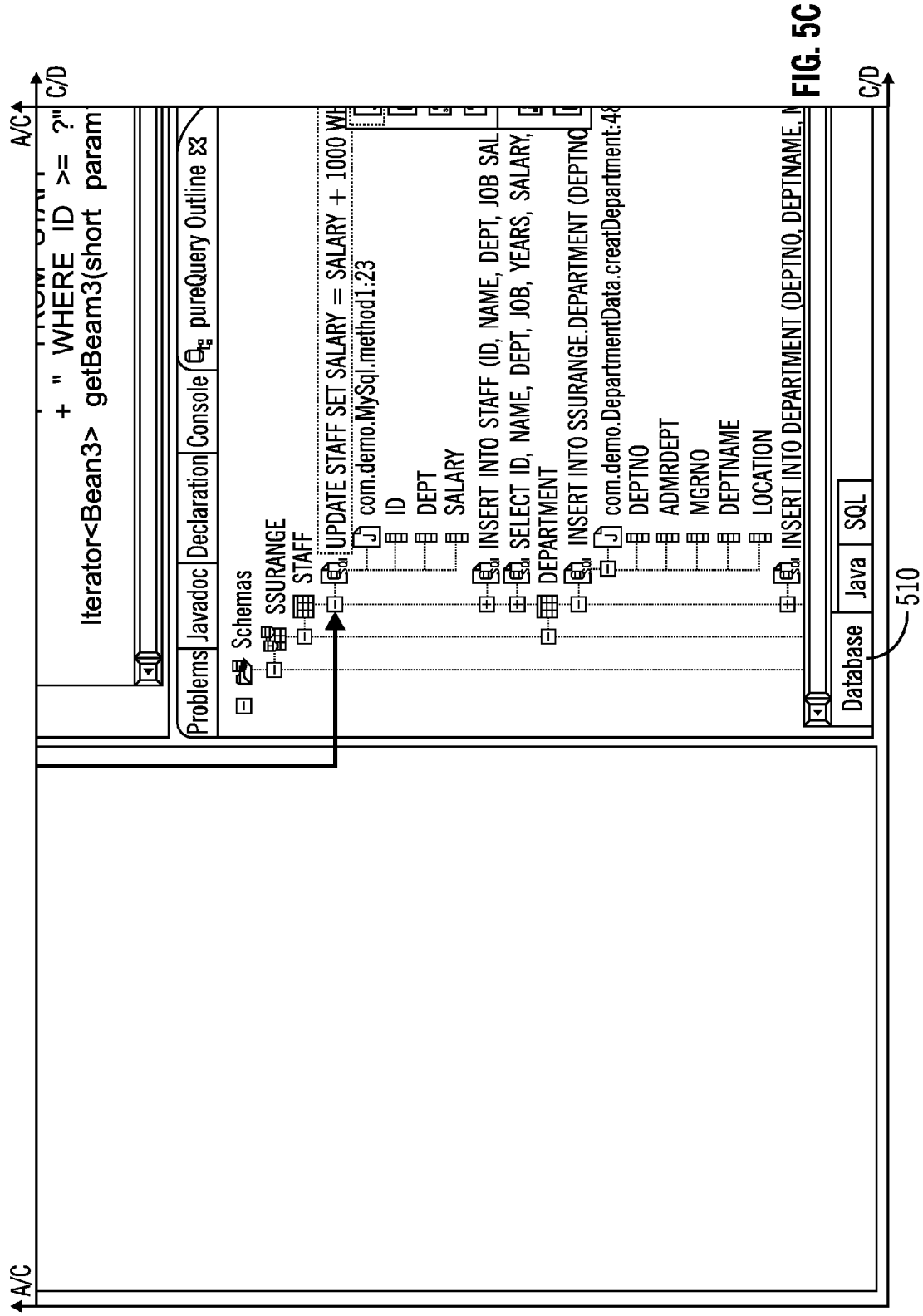
Figure 5D:
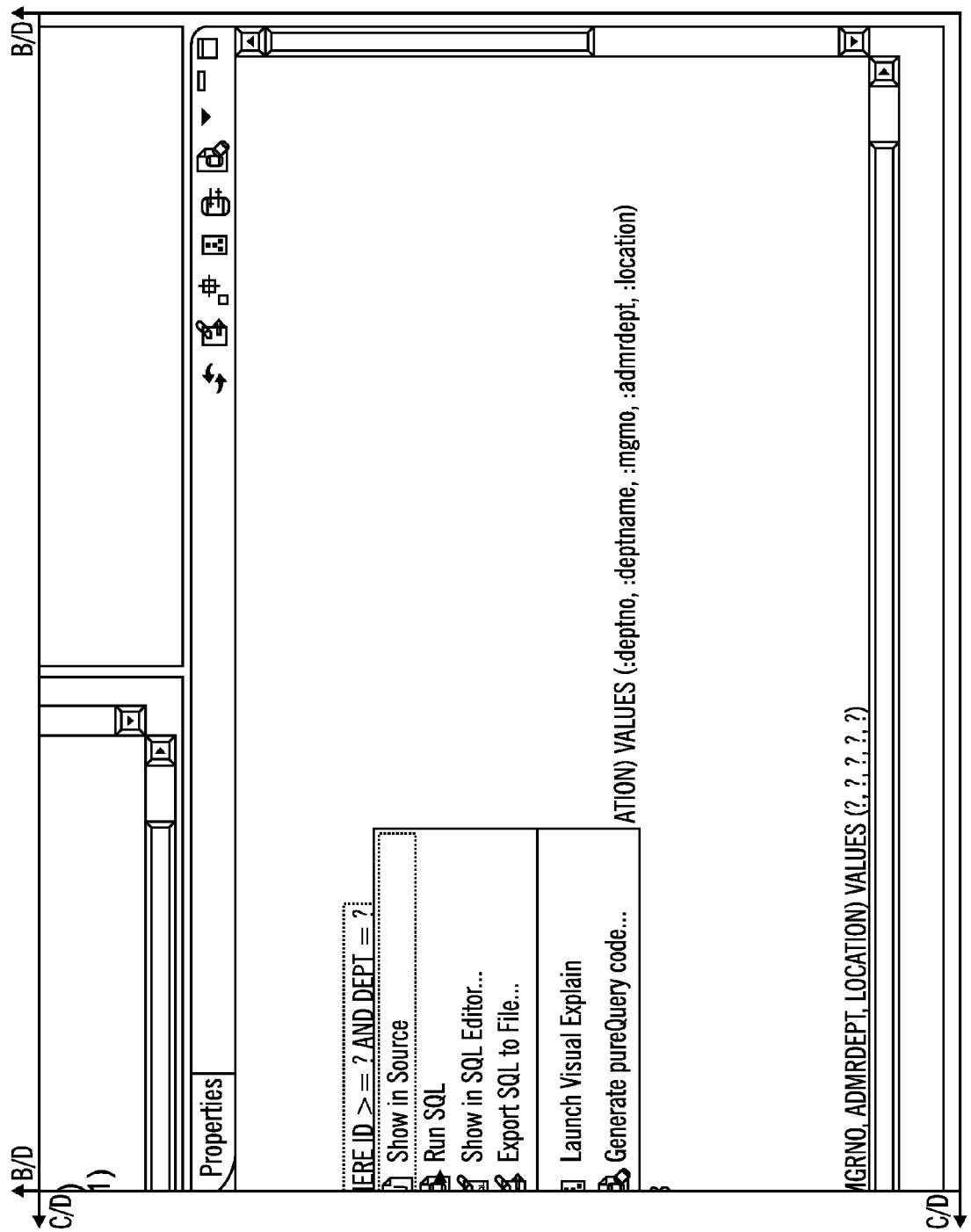

FIG. 4 illustrates logic performed by the analyzer 150 and UI generator 118 in accordance with certain embodiments. Control begins at block 400 with the analyzer 150 analyzing the client application 112 to identify queries and the locations of the queries in the client application 112.

The analyzer 150 performs complex analysis using JAVA® models (which represent the JAVA® application), query models (which represent the query (e.g., a parse tree), source code parser 114, query parser 115, database models, XML parsers, Web Services Description Language parsers to scrub information from artifacts such as JAVA® client applications, web services, and routines (e.g., procedures and User Defined Functions (UDFs)). Not only is the source code analyzed for any queries that are hardcoded, the source code is also combined with dynamic analysis information collected by running the application to ensure that queries that are constructed at execution time are collected as well.

In certain embodiments, the analyzer 150 performs complex analysis to combine the results of source information 180 from static analysis (i.e., without running the client application 112) and intersects the source information 180 with the stack trace 182 produced by the dynamic analysis to provide further accuracy in the source code location for each query.

In block 402, the analyzer 150 identifies database objects 186 used by the queries. In certain embodiments, each query collected is analyzed with the query model and the query parser 115 to identify which database objects 186 the query uses.

In block 404, the analyzer 150 stores the collective information as analyzer results 178 in the repository 169.

In block 406, the UI generator 118 in the development environment 110 generates user interface views (further described with reference to FIGS. 5-13) using the analyzer results 178 to allow analysis of the analyzer results 178. That is, the UI generator 118 presents information to a user in UI views to enable the Set of Questions (listed above), as well as other questions, to be answered in a productive, intuitive, and usable way.

In certain alternative embodiments, the analyzer 150 retrieves the correlator results 172, and the UI generator 118 generates user interface views (further described with reference to FIGS. 5-13) using the correlator results 172 to allow analysis of the correlator results 172. Embodiments provide integrated tools (e.g., the correlator 130, the debugger 140, the analyzer 178, and the UI generator 118) that provide the analyzer results 178 within the development environment 110 to further reduce the gap while developing queries in the JAVA® application within the JAVA® development environment 110 reduce gap while developing queries in the JAVA® programming language within the JAVA® environment.

The integrated tools add value not only to developers who gain insight into the database objects 186 used by the queries, but also to DBAs and other roles outside of development, to gain knowledge about where the queries (which are potentially performing badly as reported by database performance tools) are located in the source code. Embodiments provide advanced integration between the queries and the JAVA® application that will benefit problem determination of poorly performing queries.

Embodiments focus on the use of various techniques (i.e., static analysis, source code indexing (creating the searchable index 116), dynamic analysis, and instrumentation), sometimes in combination, to assist developers in problem determination and where used analysis, leading to higher productivity for developers.

Static analysis allows developers to understand source code without having to run the client application. For example, with dataflow analysis, developers may understand the relationship between variable declarations and usages. The developers may also make guesses to expressions that could be generated by drilling deeper on how the expressions may be formed. Such static analysis helps examine client applications.

As to source code indexing, it is customary to index source code to make it easy for developers to find their way around large number of source files. For instance, the source code parser 114 enables developers to find JAVA® classes and API calls within their workspace. Workspace may be described as a place where client applications 112 are located in the development environment 110. These types of analysis may be used to locate queries in client applications 112.

As to dynamic analysis, such as the JAVA® programming language, it is possible to perform introspection of the client application 112 while the client application 112 is running Introspection may be described as obtaining the stack trace 182 from the client application 112 as the client application 112 is running There are also tools, such as debugging API tools (e.g., debugger 140), which help developers debug at the source level.

Traditional instrumentation often requires changes to the source code. The JAVA® programming language has made it easier to do byte code instrumentation. Byte code instrumentation is a technique that allows modifying the client application 112 while the client application 112 is running, without requiring changes to the source code. This, for example, allows pure JAVA® profilers to profile source code by dynamically inserting calls to the profiler on routines during application loads. A profiler may be described as allowing tuning to obtain performance data from the client application 112.

To answer the first question in the Set of Questions ("Where are the one or more queries located in the source code?"), the analyzer 150 employs multiple strategies to extract the queries within the client application 112 since no single technique works best for the different ways in which the client application 112 may make use of the queries. The first strategy is to employ static analysis. Given a language, such as the JAVA® programming language, the analyzer 150 leverages the JAVA® model to shallow parse the source code to build up a list of API calls. A shallow parse may be described as a process for extracting enough information from the source code to obtain the API call and the parameters of the API call (without trying to understand the relationship between variables, call chains, etc., in this stage). In certain embodiments, the analyzer 150 invokes the source code parser 114 to do this. Whether the client application 112 is a JDBC® application or is using frameworks, such as JPA or Hibernate, there are standard API calls (e.g., the API calls in Set A above) that the client application 112 will use to issue queries. Using source code indexing, the analyzer 150 searches amongst the source code for the standard API calls. For example, the analyzer 150 searches for the locations where a prepareStatement call is made on a Connection. Once the source location that issues one of these interfaces is located, the analyzer 150 uses static analysis to analyze the source code. For example, the following is a JAVA® Code Fragment:

JAVA® Code Fragment
Connection connection=connection.createStatement( );
PreparedStatement
   pstatement=connection.prepareStatement("select name from dept");

Given the JAVA® Code Fragment located using this static analysis, the analyzer 150 extracts (e.g., by invoking the source code parser 114) the query text directly from the argument list of the JAVA® Code Fragment. Deeper analysis may be performed for more complex expressions. For example, the following is Statement A:

Statement A
String s="select name from dept";
PreparedStatement
   pStatement=connection.prepareStatement(s);

For statement A, the analyzer 150 performs data flow analysis to correlate the query to the string defined in a statement before. In come cases, static analysis may work for more complex expressions such as Statement B:

Statement B
PreparedStatement
   pStatement=connection.prepareStatement(getSql(x))

Sometimes the query is not determined by static analysis alone. For example, queries that are read from files or constructed dynamically through complex logic may be easier to intercept at run time. In such cases, dynamic analysis instrumentation may be used. For example, the analyzer 150 intercepts the query through multiple means:

i. One means is using an execution stack trace. By using a wrapped connection object, the analyzer 150 intercepts the query when a query call is being made. This allows examination of the stack trace at the point the query is issued to connect the query with the sources responsible for issuing the query.

ii. Another means is through the use of a debugger 140. When using the debugger 140 to walk through the source code, the debugger 140 sets break points at which the query call is being made. These locations may be found by searching the source code for well known query API calls. After the breakpoint is reached, the debugger 140 examines the call stack for the location of the source as well the as the query as a parameter to the API call.

iii. Yet another means is through the use of instrumentation. Similar to use of the debugger 140, embodiments add additional source code during application load time to instrument the source code being executed. By inserting the source code around the query execution points, embodiments extract the query being executed and also record the source information linking the query to the source executing the query.

In certain embodiments, dynamic analysis does not change source code for the analysis.

With both static and dynamic analysis, embodiments gain insight into the relationship between the source code and the query. Embodiments compose a user interface (UI, also referred to as a Graphical User Interface (GUI)) linking the query with the source code, if the source code is available. The information is precise enough to link to the source file and the correct line number at which the query is located. For example, double-clicking or using menus from each query point takes the user to the line of source code. If the source code is not available, dynamic analysis results pointed to the .class file information. When using frameworks that use object query languages in the client application 112, but that depend on the framework to create the query at execution time, the line of source code triggering the generation of the query is shown. For example, in a JPA case, the query generated by the commit API call points back to the commit( ) in the source code.

FIGS. 5A, 5B, 5C, and 5D illustrate a user interface view 500 showing linking to a query when using JDBC® in accordance with certain embodiments. FIGS. 5A, 5B, 5C, and 5D may be described as providing information in response to the first question in the Set of Questions ("Where are the one or more queries located in the source code?"). In user interface view 500, database tab 510 (FIG. 5C) has been selected by a user, and database schemas and database objects are shown. Also, a "Show in Source" menu has been selected, which shows where a query ("UDPATE STAFF SET SALARY=SALARY+1000 WHERE ID>=? AND DEPT=?") is located in source code 520.

Embodiments allow JAVA® Persistence API Language queries (JPAQL) (i.e., an object query language for the framework JAVA® Persistence API) in source code. JPAQL is a type of query. Queries to the database 170 are supported whether they are in object query language (e.g., JPAQL) or standard query language (e.g., SQL).

The static and dynamic analysis techniques work on any type of client applications 112, including iBATIS/Spring types of frameworks that contain a well defined interface in which queries are issued to the database 170. By creating relationships between the client application source and the resulting queries, embodiments show developers how their client applications 112 affect the database 170. This is educational for users of ORM frameworks, such as JPA or Hibernate, because the framework hides the query from the developers.

During problem determination, when presented with queries from DBAs, application developers sometimes go back to the client application 112 to locate which line causes the problem. Embodiments provide a mapping between the query and the source code that makes the problem determination task simpler.

Beyond mapping the source code and the queries, the captured queries are also used to show the relationship between web services and queries in a web environment. In certain embodiments, capture is done in two places: 1) at the entry point of the web service and 2) at the site in which queries are issued. Using instrumentation, embodiments instrument a web services call to retrieve the URL and the resulting query generated, providing a view between web services and the database actions.

To answer the second question in the Set of Questions ("What are the one or more queries issued by a certain JAVA® class?"), further analysis is performed on the information gathered with source code indexing. With information gathered by both static and dynamic analysis, embodiments further break down the information into queries used per JAVA® class. This information is available with or without source code availability when using frameworks or JDBC®.

Figure 6:
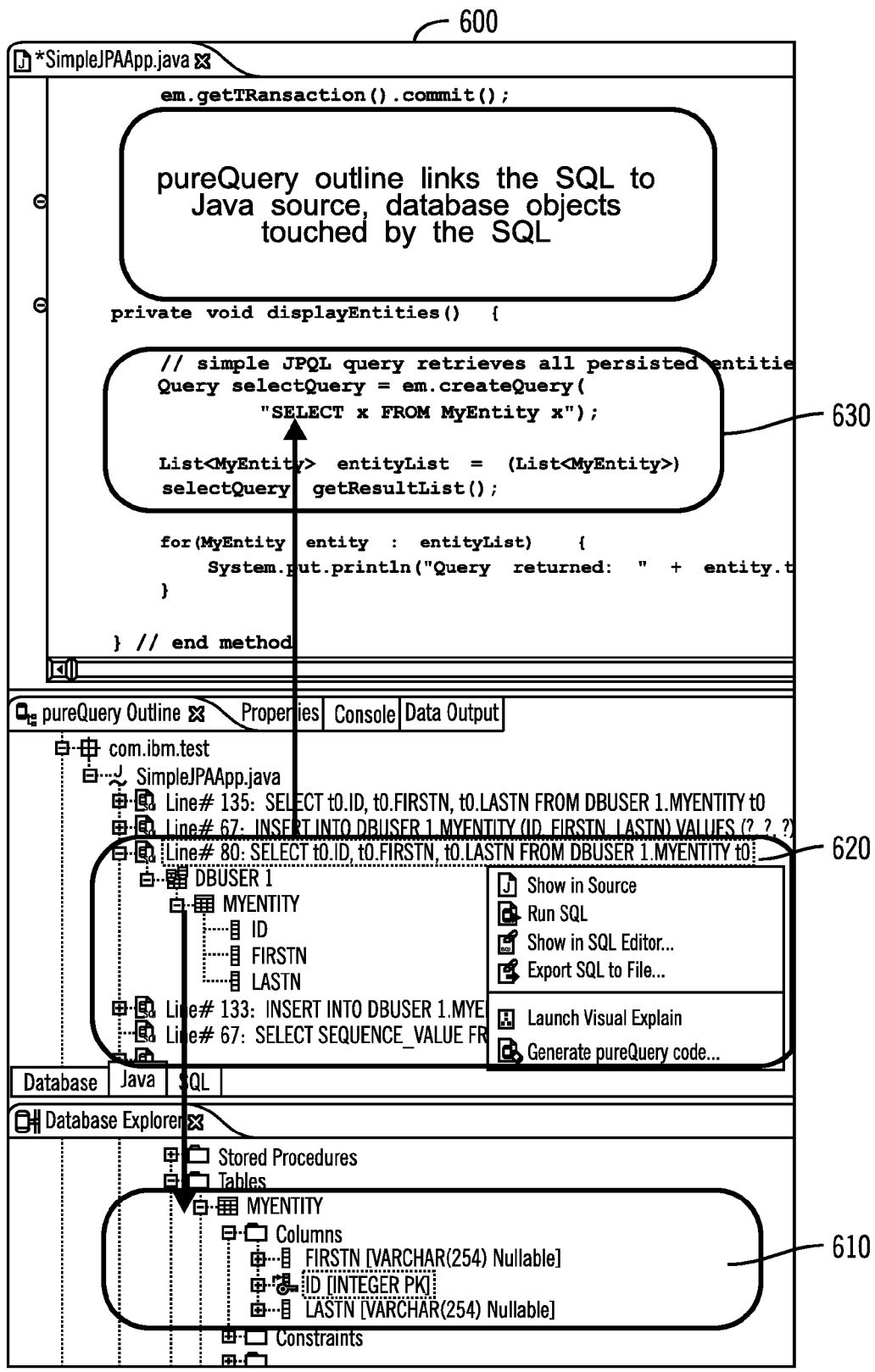
FIG. 6 illustrates a user interface view showing selection of a JAVA® tab in accordance with certain embodiments.

FIG. 6 illustrates a user interface view 600 showing selection of a JAVA® tab in accordance with certain embodiments. FIG. 6 may be described as providing information in response to the second question in the Set of Questions ("What are the one or more queries issued by a certain JAVA® class?"). User interface view 600 illustrates links between database objects 610, a query 620, and object query language 630.

Figure 7:
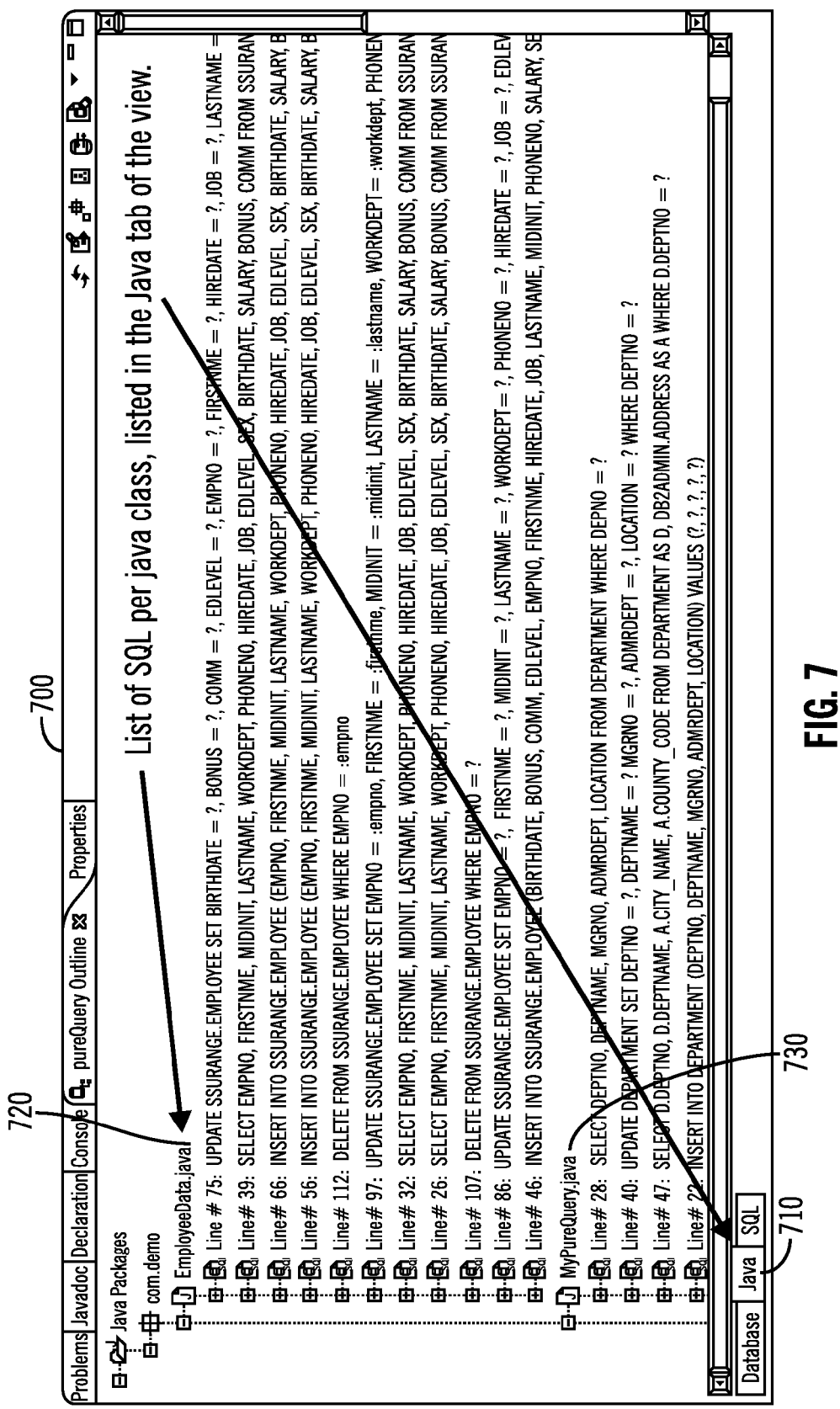
FIG. 7 illustrates a user interface view showing further details of a list of queries per JAVA® class in accordance with certain embodiments.
Figure 10A:
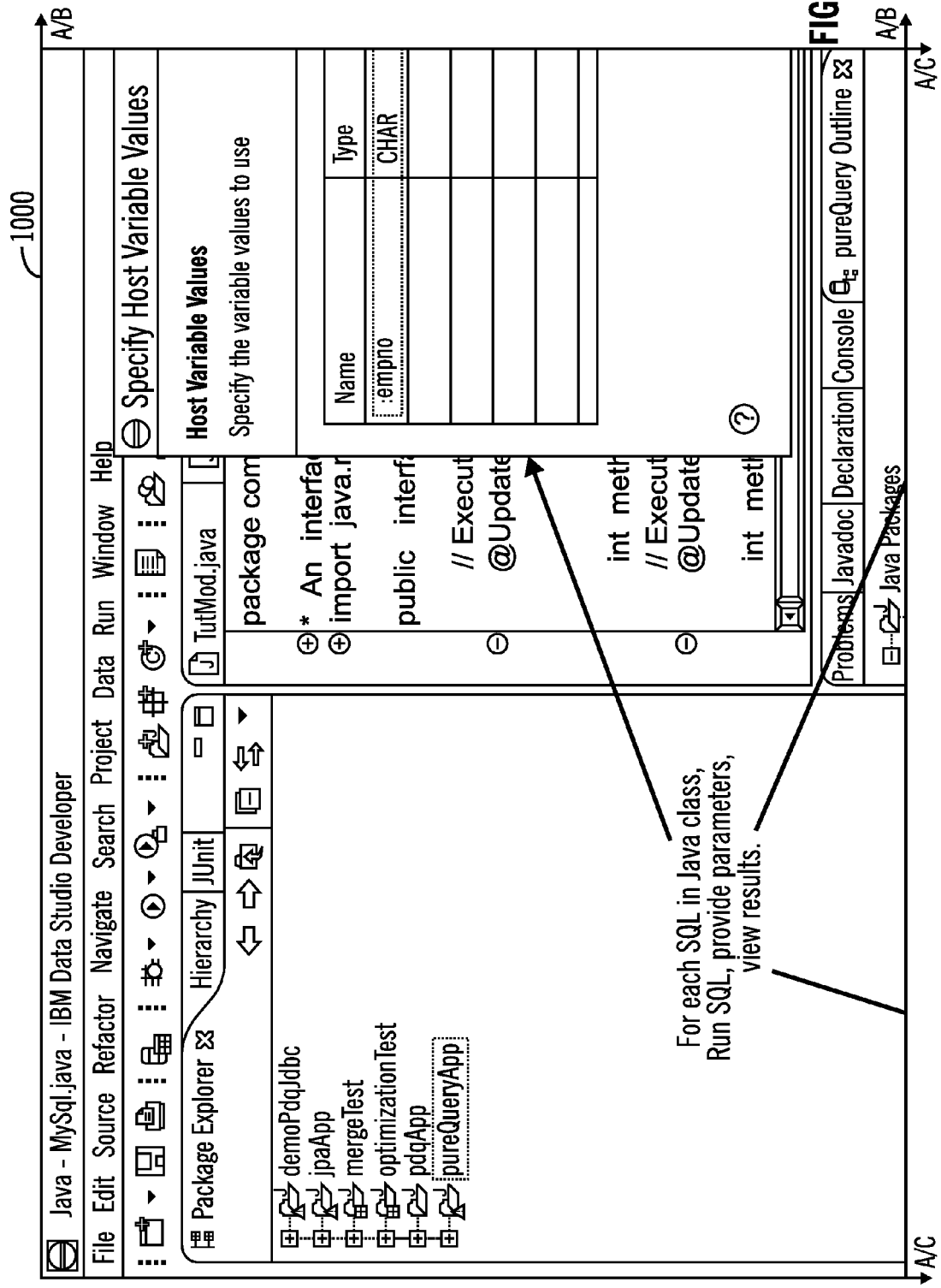
FIGS. 10A, 10B, 10C, and 10D illustrate a user interface view showing how queries may be run with a "Run SQL menu" in accordance with certain embodiments.
Figure 10B:
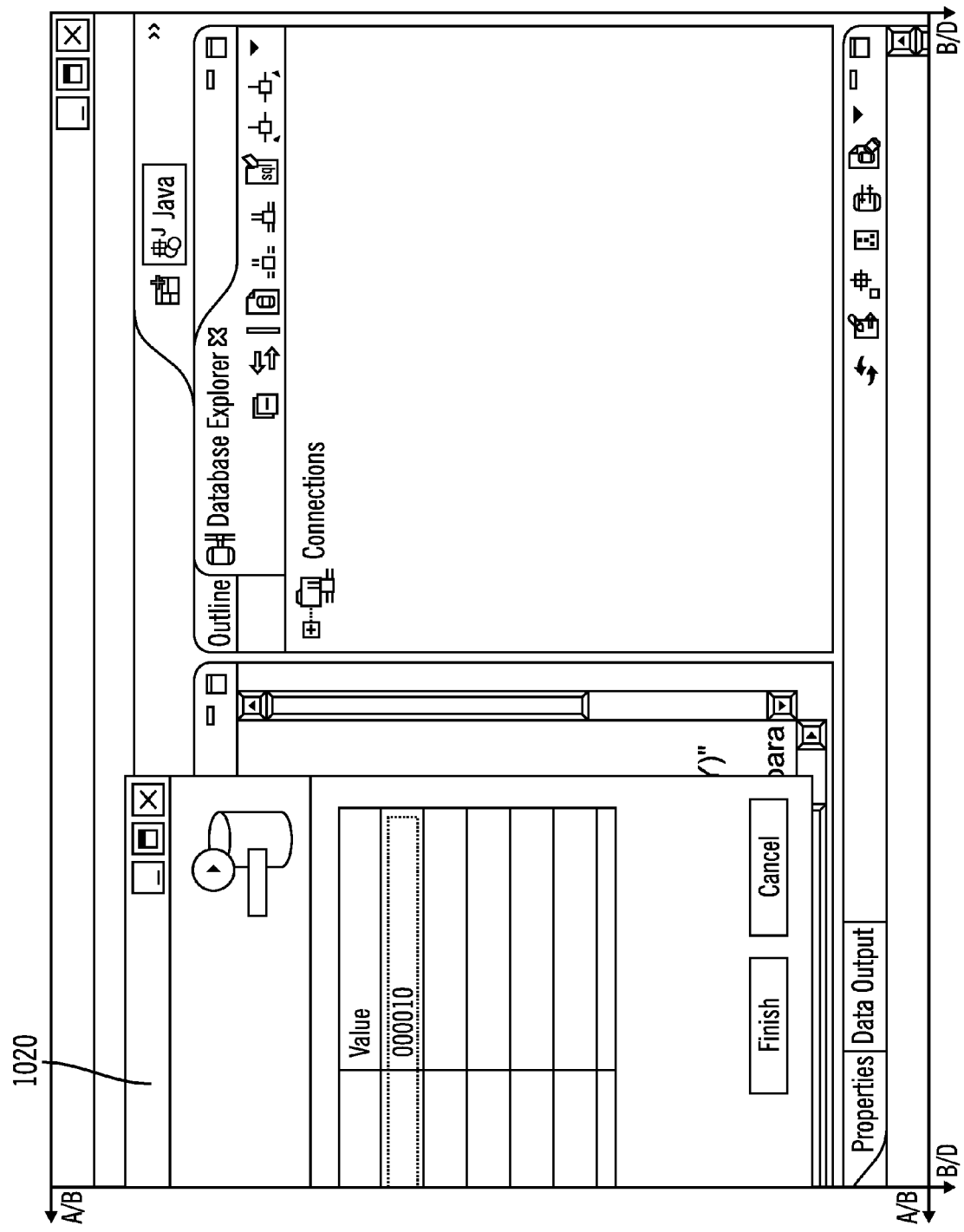
Figure 10C:
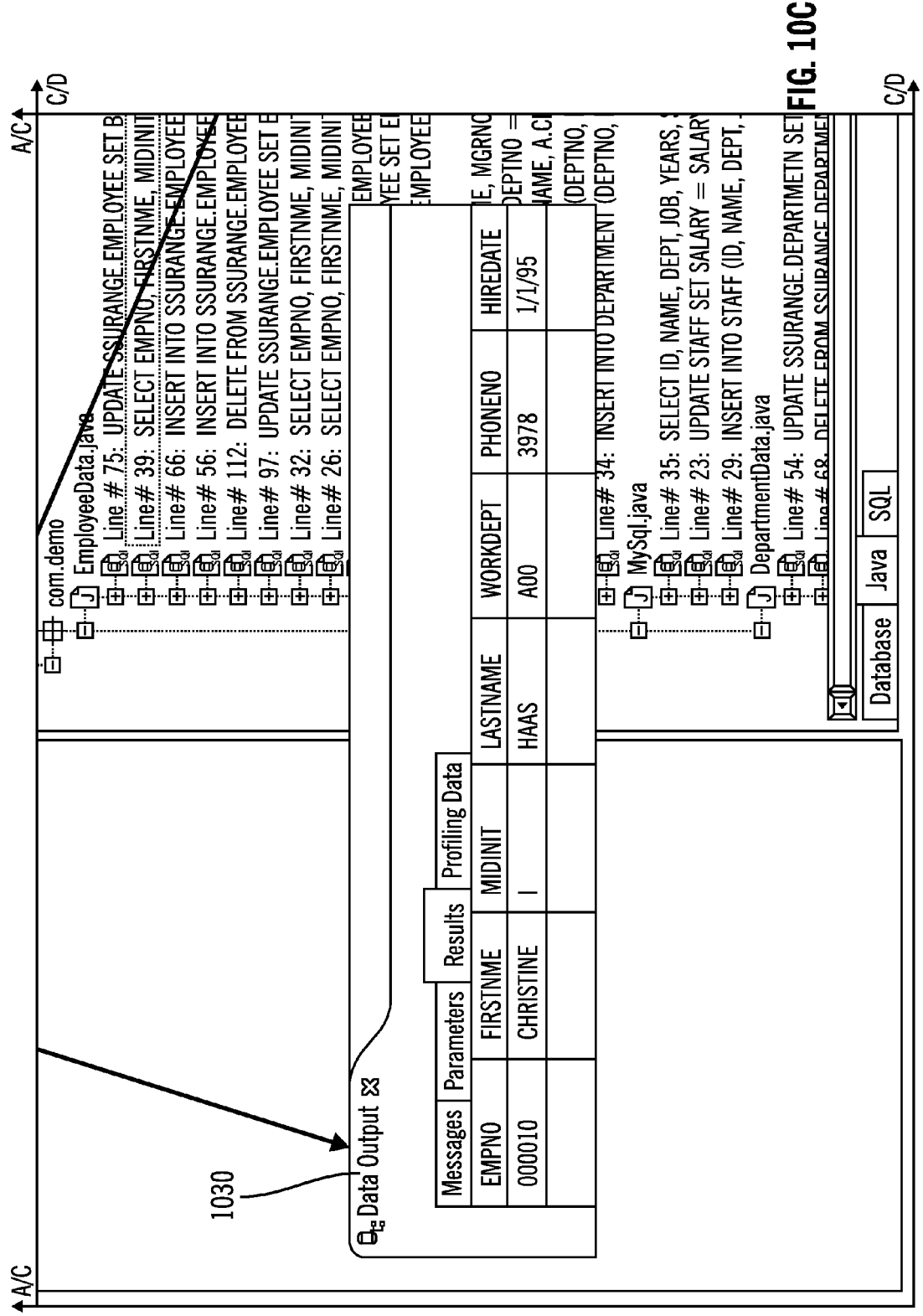
Figure 10D:
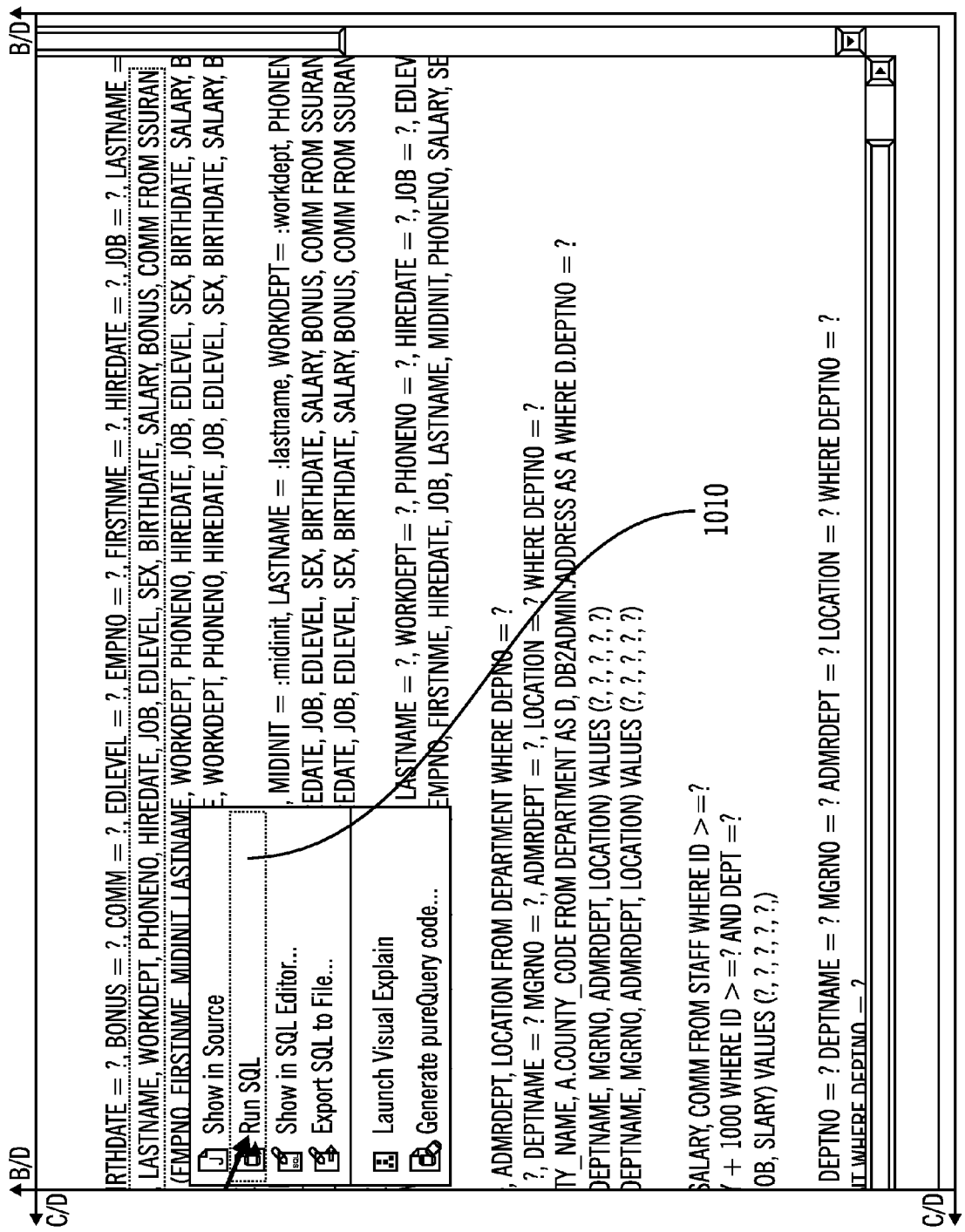
Figure 11A:
Figure 11B:
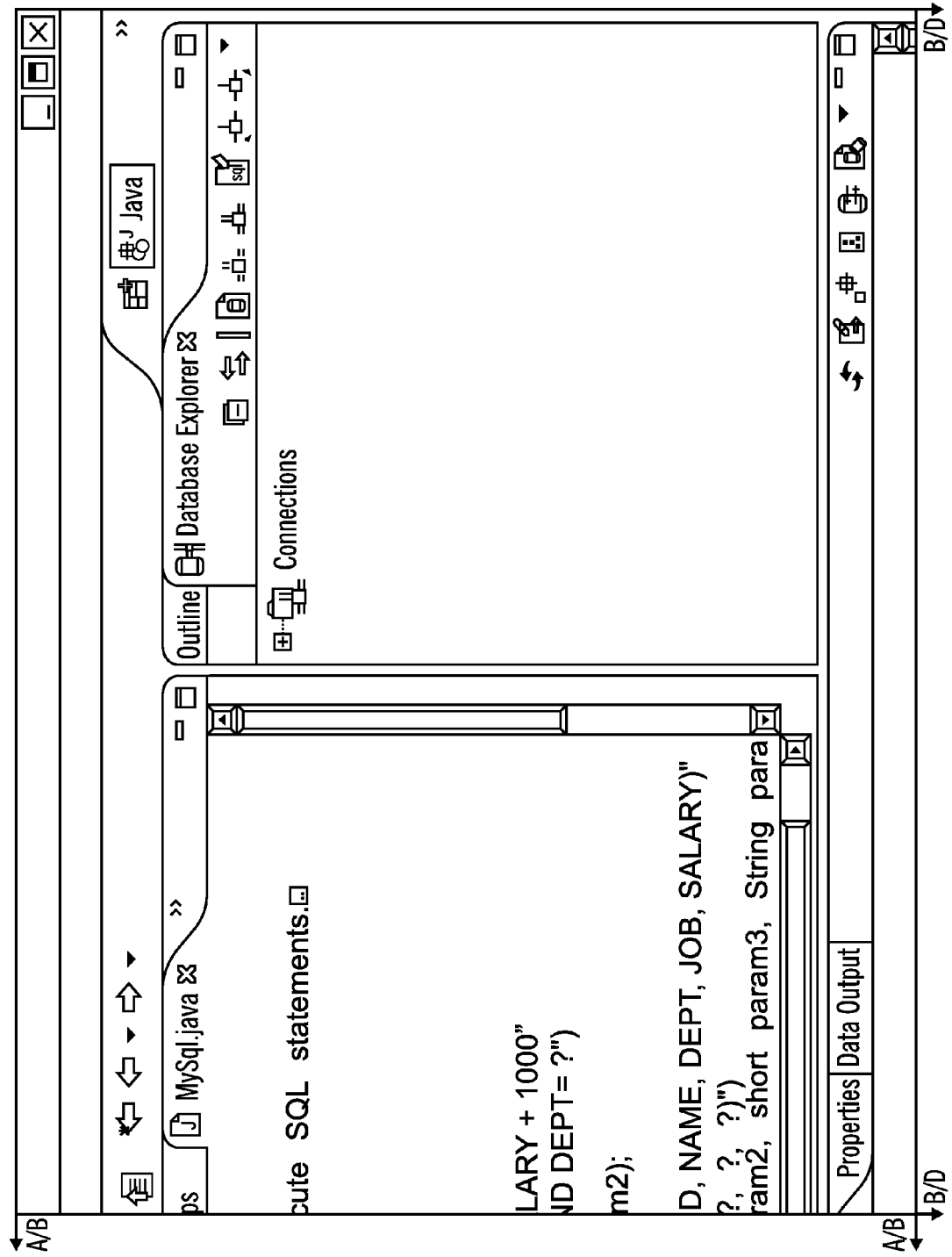
Figure 11D:
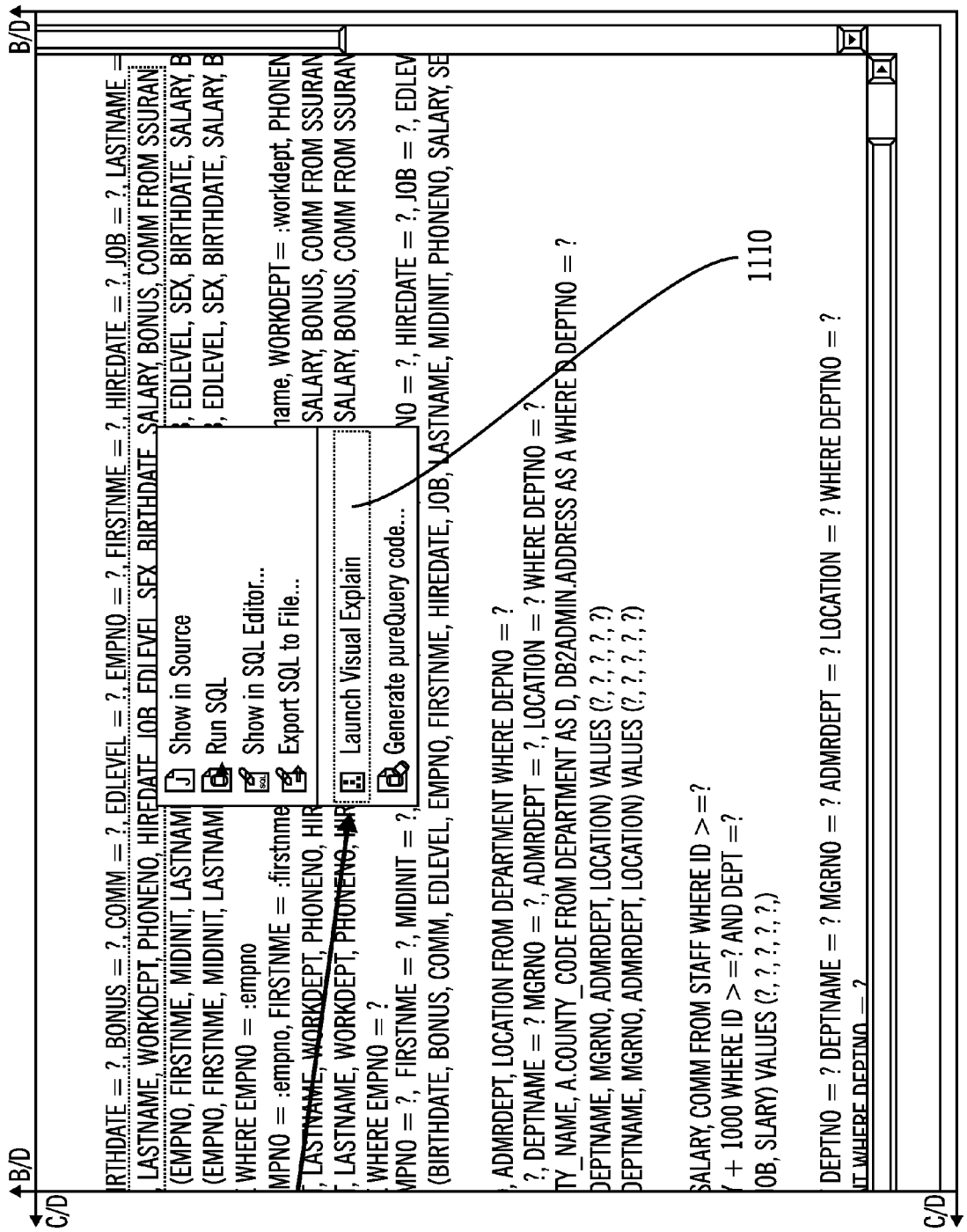
Figure 12A:
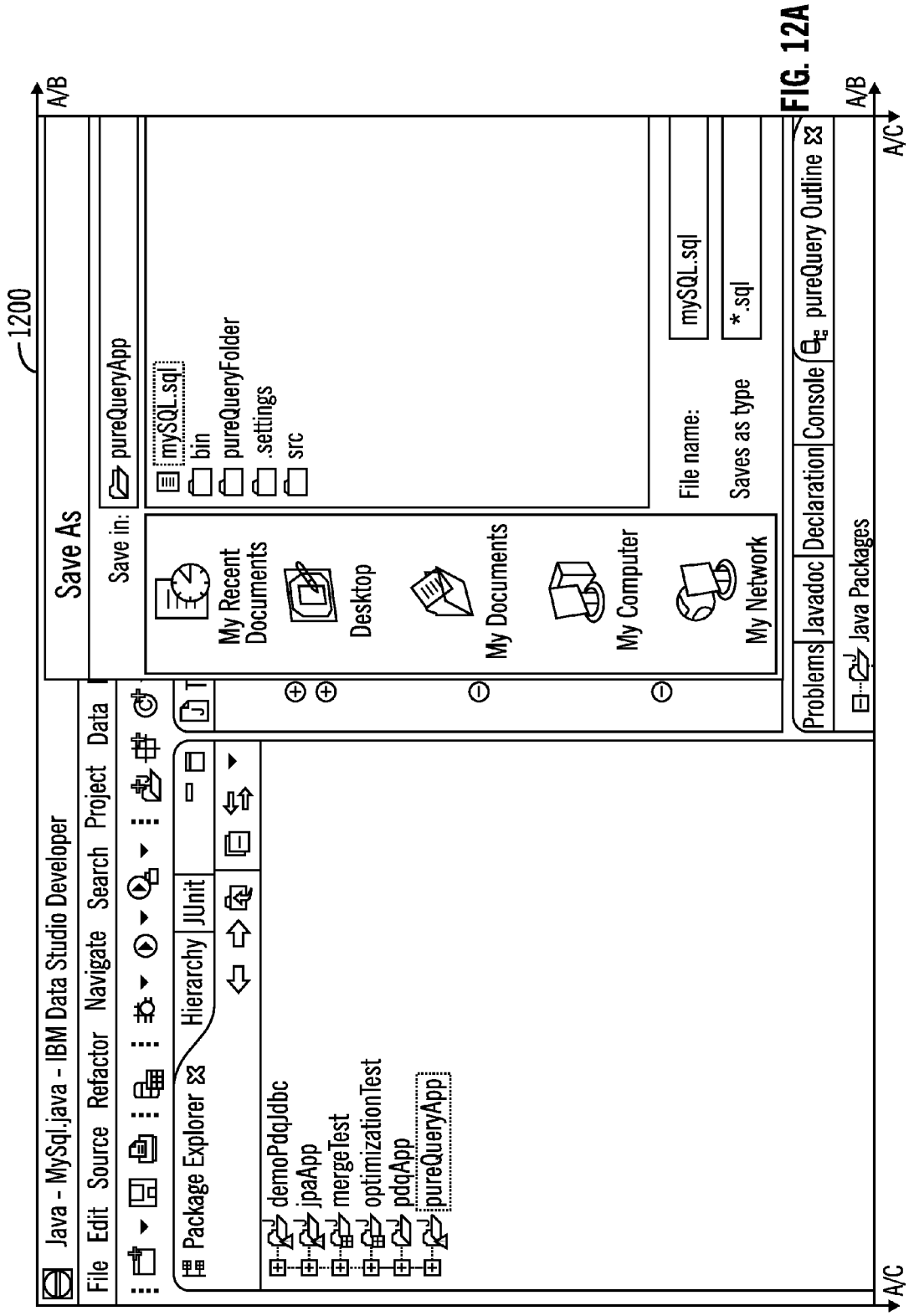
FIGS. 12A, 12B, 12C, and 12D illustrate a user interface view for exporting data in accordance with certain embodiments.
Figure 12B:
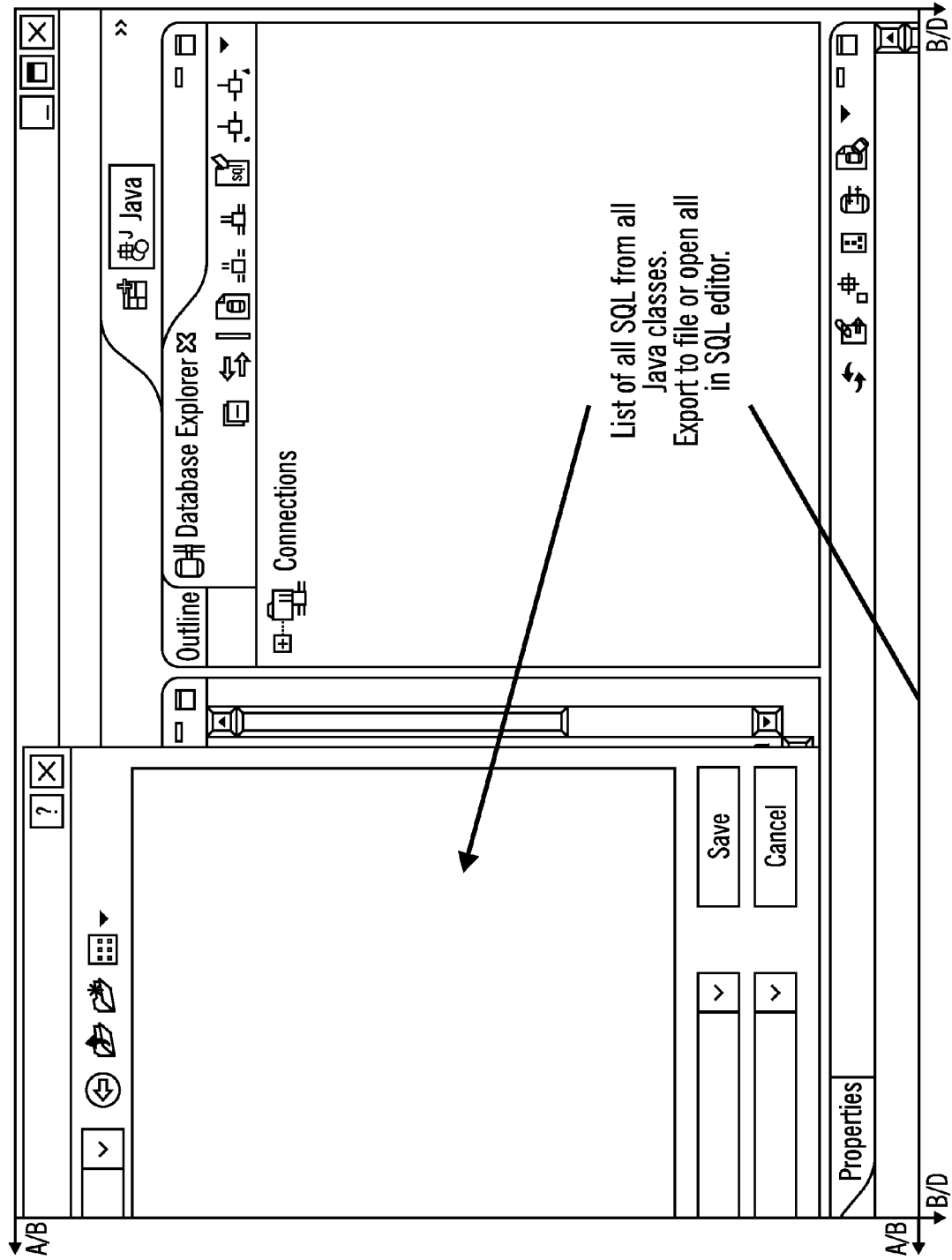
Figure 12C:
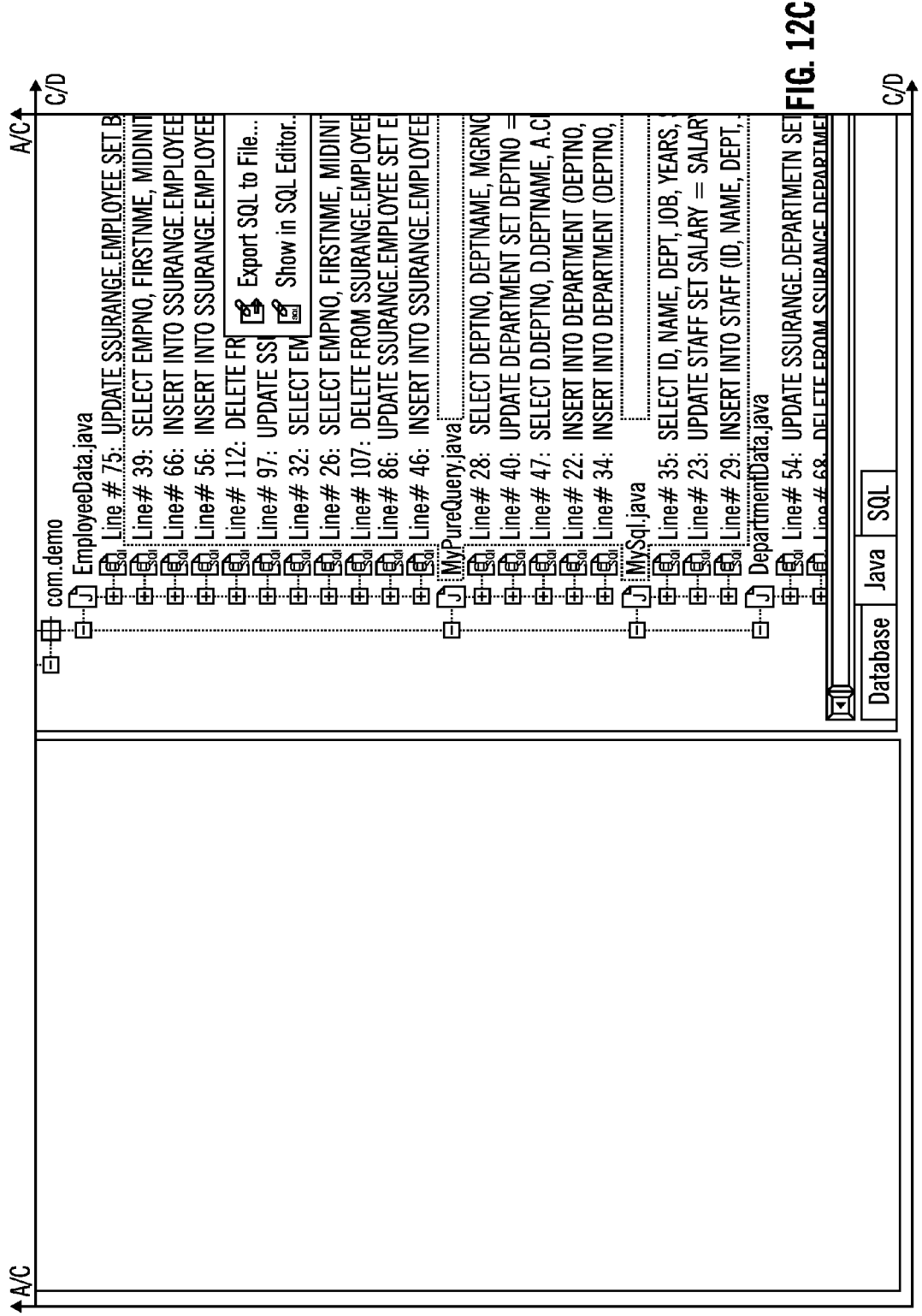
Figure 12D:
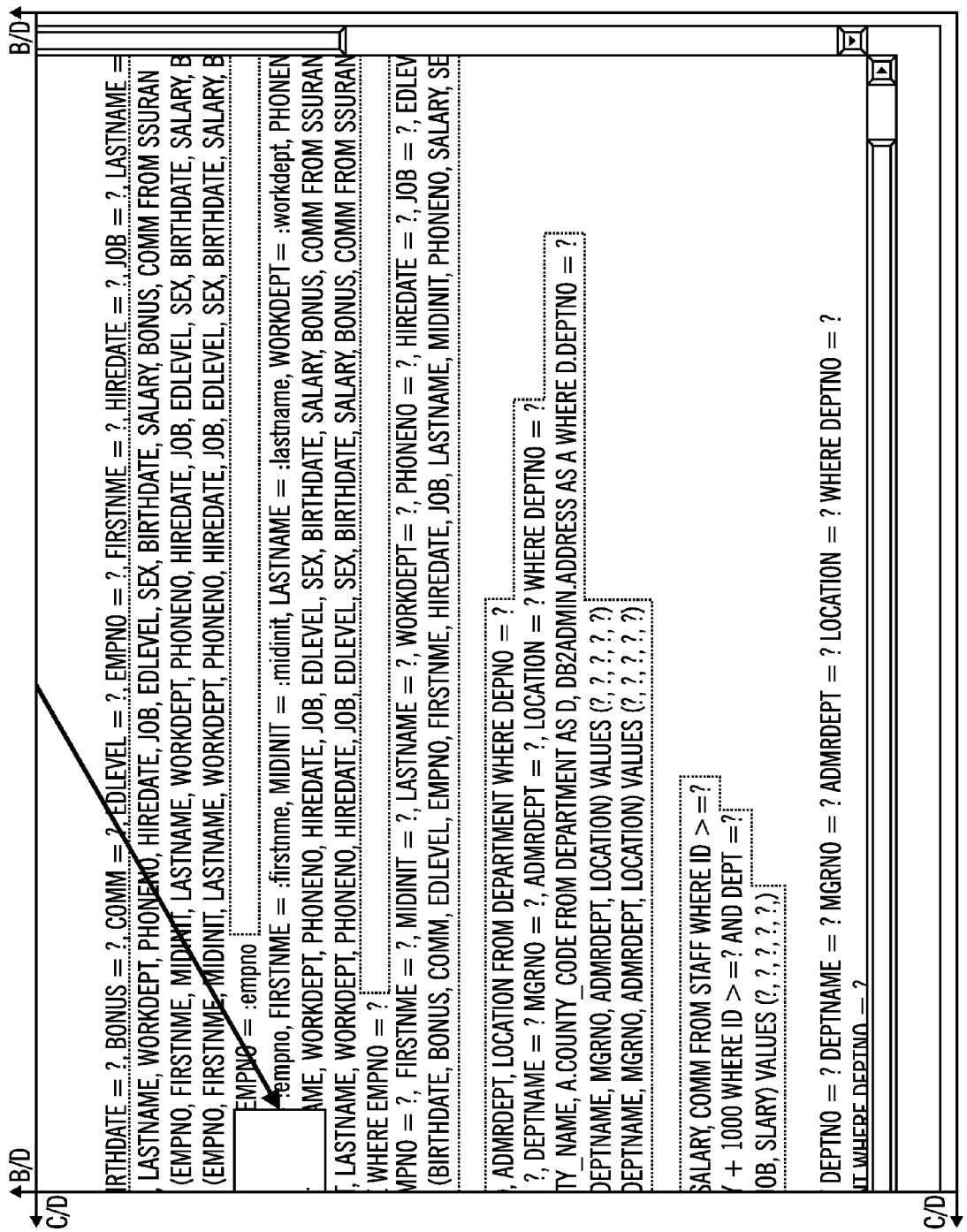

FIG. 7 illustrates a user interface view 700 showing further details of a list of queries per JAVA® class in accordance with certain embodiments. In user interface view 700, the JAVA® tab 710 has been selected by a user, and query statements for JAVA® classes 720 and 730 are shown.

To answer the third question in the Set of Questions ("For each query, what are the database schema 176 and database objects 186 (e.g., tables and columns) that the query uses?"), embodiments perform dependency analysis to enable users to understand how the database schema 176 is used by the source code. To facilitate the understanding of how each query is used, embodiments parse each query with the appropriate query parser 115 for the individual databases 170. Embodiments provide the result through the user interface.

Figure 8:
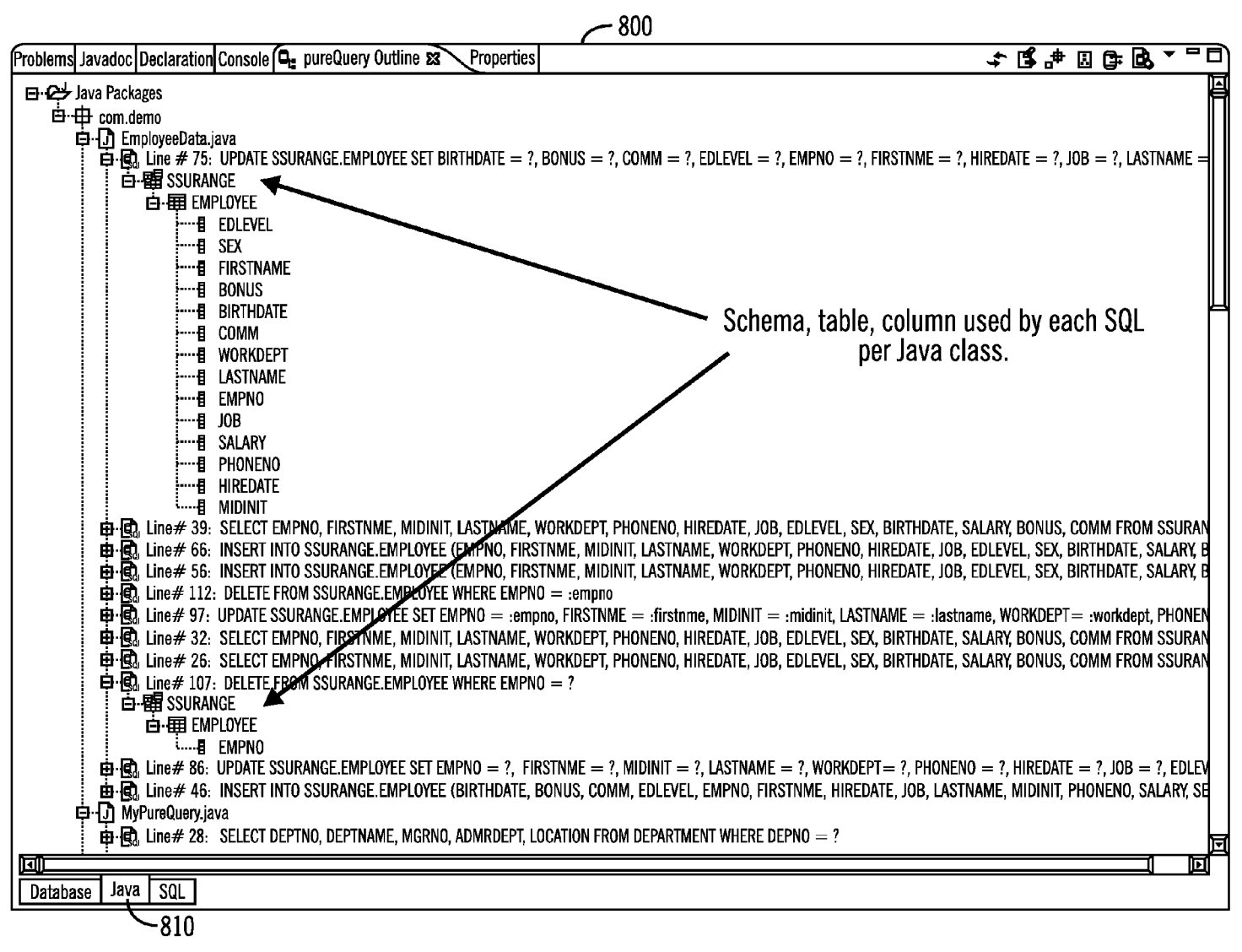

FIG. 8 illustrates a user interface view 800 showing database schemas 176 and database objects 186 that a query uses in accordance with certain embodiments. In the user interface view 800, the JAVA® tab 810 has been selected by a user.

Figure 9:
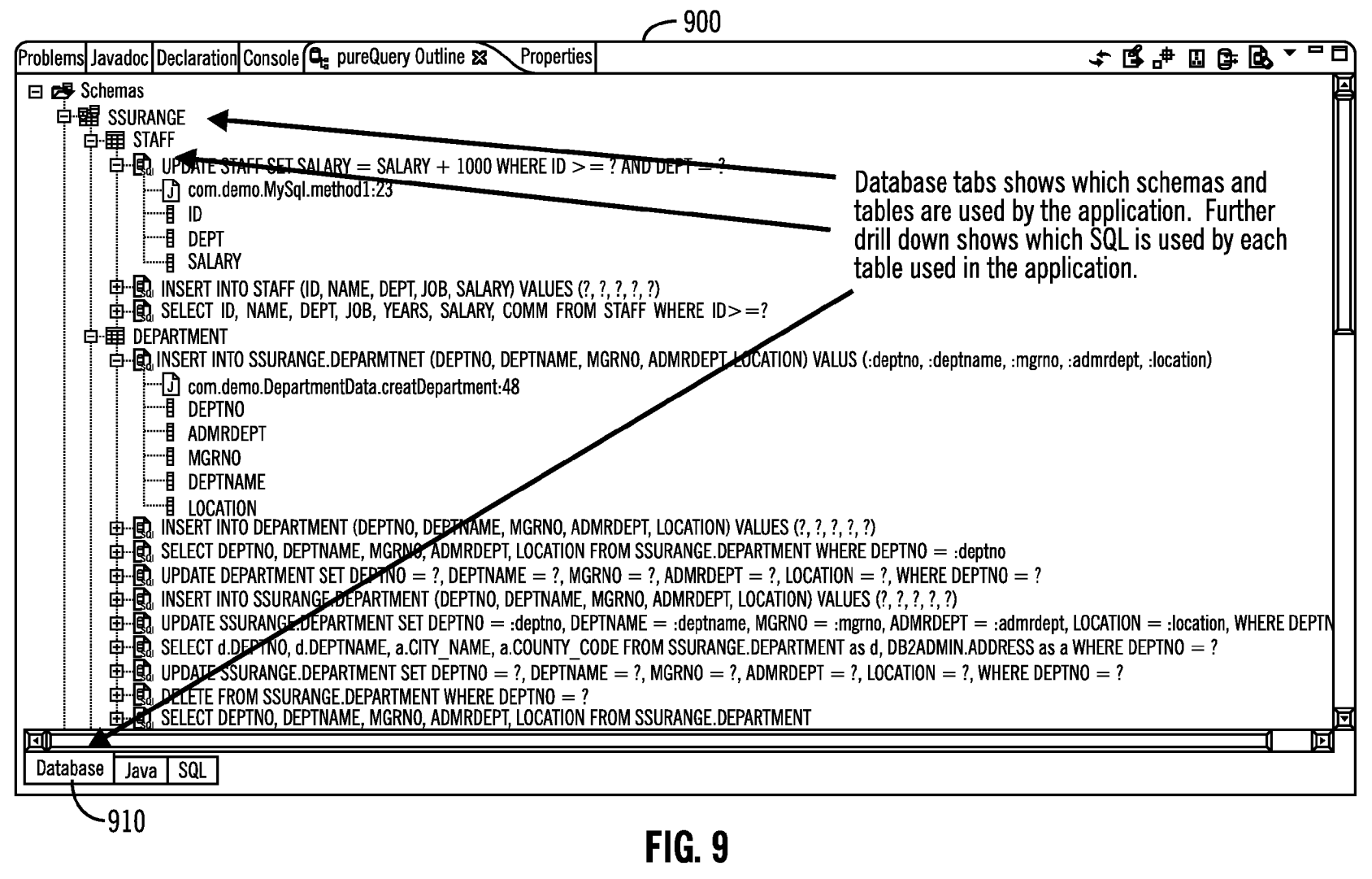

To answer the fourth question in the Set of Questions ("For each database schema 176 or table used by the client application 112, what are the one or more queries issued by the client application 112?"), embodiments use dependency analysis with dynamic analysis to present the user with a view based on how the database schema 176 is accessed regardless of the client application 112. By gathering up the dependency information of the queries that access an individual table or column, embodiments build up a view of how database objects 186 are used. Developers may use this view to predict the amount of changes for an upcoming database change. FIG. 9 illustrates a user interface view 900 showing queries used by each database object 186 in accordance with certain embodiments. In the user interface view 900, the database tab 910 has been selected by a user.

To answer the fifth question in the Set of Questions ("Does the query execute producing the results as expected?"), embodiments provide tools as part of the UI generator 118 or analyzer 150 that allow execution of queries. Queries with any parameters may be executed by providing the values in the user interface. The user may select rollback or commit for each sample run. The user may filter out query columns to view to select a maximum number of rows to be retrieved. Embodiments remember parameter values across query executions. Embodiments show results in query execution views. Providing this extensive functionality is useful, especially in the case of frameworks where there is no visibility to the queries from the source code. FIGS. 10A, 10B, 10C, and 10D illustrate a user interface view 1000 showing how queries may be run with a "Run query menu" in accordance with certain embodiments. In user interface view 1000, a "Run SQL" menu 1010 (FIG. 10D) has been selected by a user, parameters are provided by the user through a "Specify Host Variable Values" box 1020, and data output 1030 (FIG. 10C) is shown.

To answer the sixth question in the Set of Questions ("How does the query perform?), embodiments run query tuning tools for each query to allow the user to view the performance of the query and to enable the user to make changes proactively at design time, thus avoiding issues in production. With query tuning tools for each database vendor, embodiments provide seamless integration. FIGS. 11A, 11B, 11C, and 11D illustrate a user interface view 1100 showing the performance of a query with a "Launch Visual Explain" menu in accordance with certain embodiments. In user interface view 1100, a "Launch Visual Explain" menu 1110 has been selected by a user.

To answer the seventh question ("What are the one or more queries issued by the client application 112?"), embodiments have knowledge in JAVA® data models and JAVA® database applications to scrub the queries from the client applications 112 based on JDBC or any proprietary framework. Embodiments perform analysis to get a full list of the queries and save to metadata, which is shown in 12A, 12B, 12C, and 12D (e.g., "Export SQL to File . . . " menu).

Embodiments have visibility into queries in the client application 112 and export the queries into a query file. Exporting allows sharing the queries with other members (such as a DBA who may then optimize the queries proactively), which enables developing higher quality client applications 112, especially when using frameworks in which client applications 112 do not provide insight into the queries in the source code but generate the queries at runtime. Thus, embodiments help problem determination and where used analysis. FIGS. 12A, 12B, 12C, and 12D illustrate a user interface view 1200 for exporting data in accordance with certain embodiments.

Figure 13A:
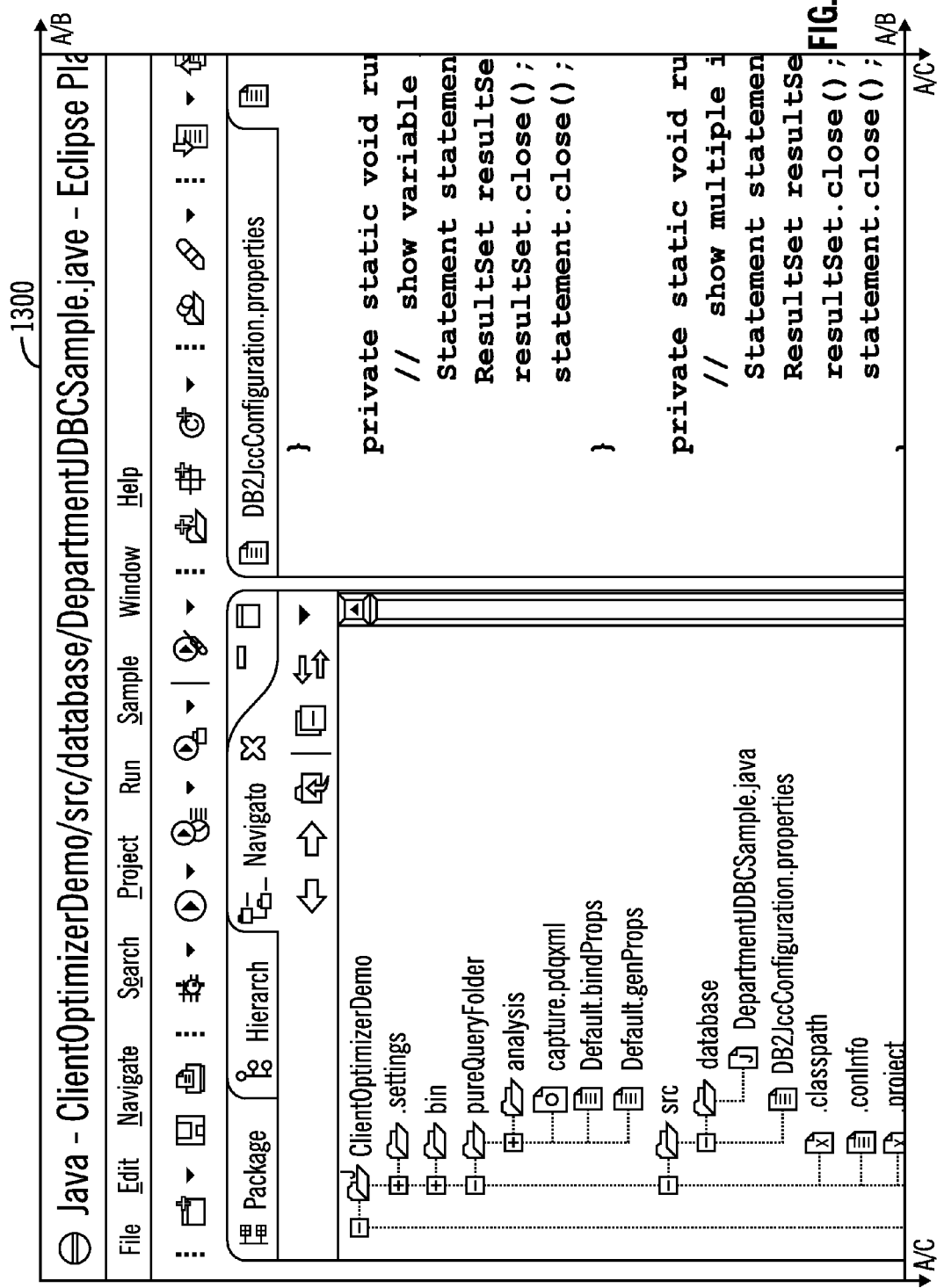
FIGS. 13A, 13B, 13C, and 13D provide a user interface view with performance information in accordance with certain embodiments.
Figure 13B:
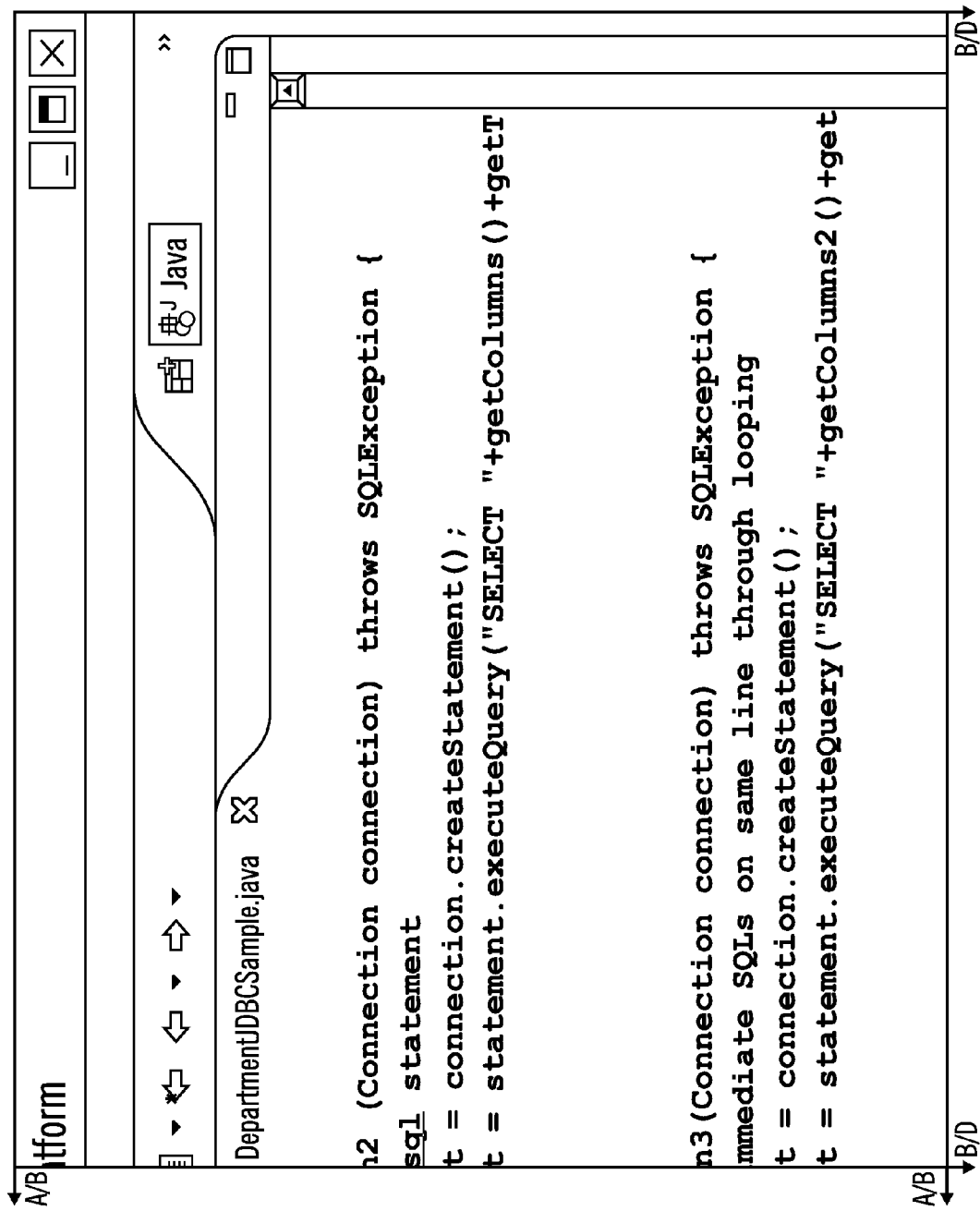
Figure 13C:
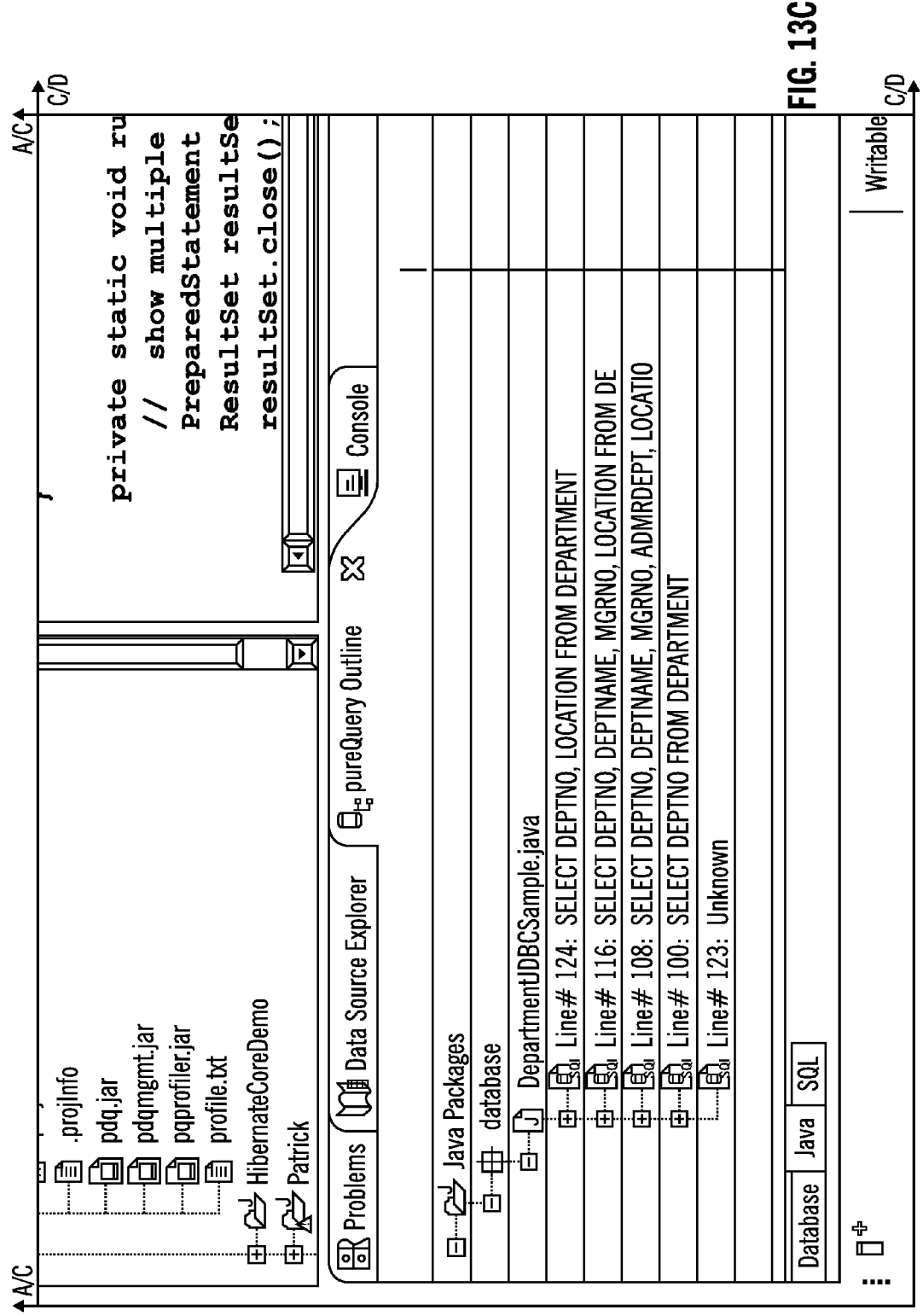
Figure 13D:
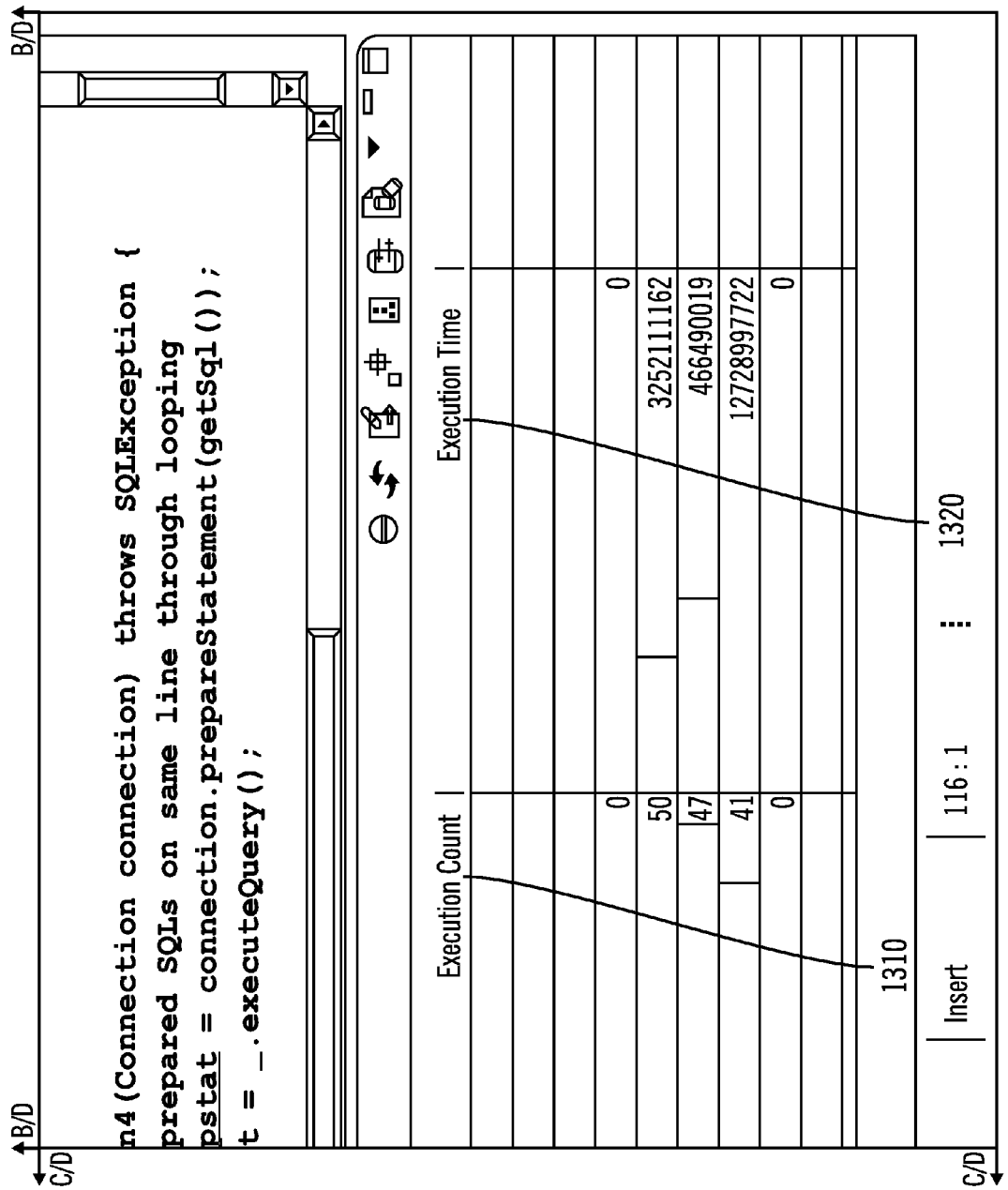

In terms of performance analysis, embodiments provide user interface views that display the queries in the client application 112, and embodiments present developers with performance data in the context of the client application 112. Some database performance monitor applications gather queries and their performance data, but have no way to trace the queries back to the client application 112. By gathering the metadata about the client application 112, including the queries the client application 112 issued and the relationship of the queries back to the client application 112, embodiments join the information with the performance data gathered by a database monitoring application to provide user interface view 1300. FIGS. 13A, 13B, 13C, and 13D provide a user interface view 1300 with performance information in accordance with certain embodiments. The user interface view 1300 includes, for each query, an execution count 1310 (FIG. 13D) and an execution time 1320 (FIG. 13D).

Thus, instead of providing just a set of queries and their performance data, embodiments show the performance data in the context of the client application 112. At a glance, the developer may locate queries that are most expensive to run and where they are in the client application 112. If refactoring of the tables is required, the developer may assess the impact by switching to the user interface view to see how many queries access the table.

Thus, embodiments provide integrated tools to solve industry pain points and to provide unique value towards improving productivity for numerous roles involved in client application development such as developer, DBA, support personnel etc.

ADDITIONAL EMBODIMENT DETAILS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 14:
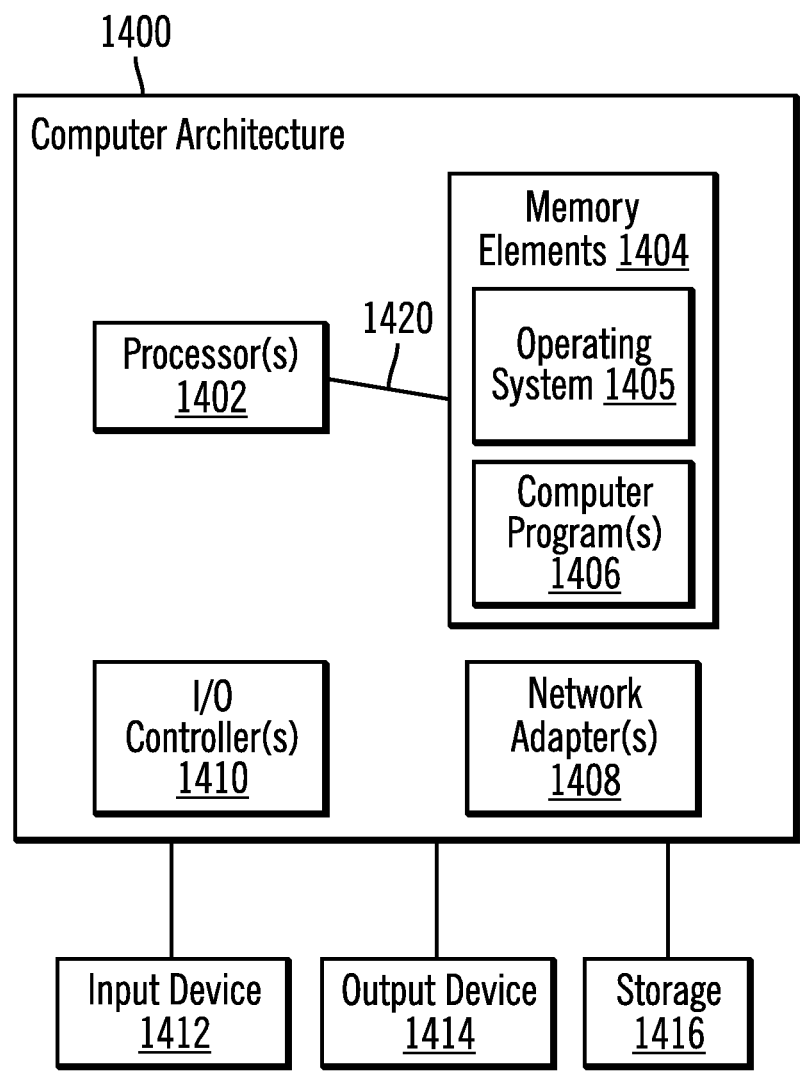
FIG. 14 illustrates a system architecture that may be used in accordance with certain embodiments.

FIG. 14 illustrates a system architecture 1400 that may be used in accordance with certain embodiments. Computer 100 may implement system architecture 1400. The system architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The system architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The system architecture 1400 may include fewer components than illustrated, additional components not illustrated herein, or some combination of the components illustrated and additional components. The system architecture 1400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
   setting, with a processor executing on a computer, one or more breakpoints in source code of a client application based on locations of Application Programming Interface (API) calls in the source code;
   while running the client application through a debugger, upon reaching each of the one or more breakpoints, identifying one or more debugger rules associated with a query at a breakpoint;
   in response to determining that conditions of the one or more debugger rules are satisfied,
      obtaining a stack trace before the query makes a call to a database;

deriving query text of the query and a location of the query in the source code of the client application;
parsing the query text to identify database objects used by the query; and
storing correlator results for the query that identify a source file of the client application, locations of an API call in the source code, parameters of the API call, and the database objects, wherein one of the parameters is the query text of the query; and
displaying user interface views in a user interface to present the correlator results for problem determination and where used analysis.

2. The method of claim 1, further comprising:
in response to determining that conditions of the one or more debugger rules are not satisfied, continuing to run the client application through the debugger until another breakpoint is reached or execution of the client application is completed.

3. The method of claim 1, further comprising:
in response to deriving the query of the API call,
obtaining the query text of the query;
invoking a query parser to parse the query to identify one or more tables and one or more columns used by the query; and
performing analysis using the correlator results.

4. The method of claim 3, further comprising:
retrieving the correlator results; and
generating the user interface views using the correlator results, wherein the user interface views provide at least one of: a view showing the query in the database and the query in the source code, a view showing database schemas and database objects that the query uses, a view showing queries per class, a view showing the queries used by each database object in the database, a view showing how the queries are run, a view for exporting data, and a view showing performance information of execution count and execution time for each of the queries.

5. A computer program product comprising a computer readable storage medium storing computer readable program code that, when executed on a processor of a computer, causes the computer to:
set, with a processor executing on a computer, one or more breakpoints in source code of a client application based on locations of Application Programming Interface (API) calls in the source code;
while running the client application through a debugger, upon reaching each of the one or more breakpoints,
identify one or more debugger rules associated with a query at a breakpoint;
in response to determining that conditions of the one or more debugger rules are satisfied,
obtain a stack trace before the query makes a call to a database;
derive query text of the query and a location of the query in the source code of the client application;
parsing the query text to identify database objects used by the query; and
storing correlator results for the query that identify a source file of the client application, locations of an API call in the source code, parameters of the API call, and the database objects, wherein one of the parameters is the query text of the query; and
displaying user interface views in a user interface to present the correlator results for problem determination and where used analysis.

6. The computer program product of claim 5, wherein the computer readable program code, when executed on a processor of a computer, causes the computer to: in response to determining that conditions of the one or more debugger rules are not satisfied, continue to run the client application through the debugger until another breakpoint is reached or execution of the client application is completed.

7. The computer program product of claim 5, wherein the computer readable program code, when executed on a processor of a computer, causes the computer to:
in response to deriving the query of the API call,
obtain the query text of the query;
invoke a query parser to parse the query to identify one or more tables and one or more columns used by the query;
and
perform analysis using the correlator results.

8. The computer program product of claim 7, wherein the computer readable program code, when executed on a processor of a computer, causes the computer to:
retrieve the correlator results; and
generate the user interface views using the correlator results, wherein the user interface views provide at least one of: a view showing the query in the database and the query in the source code, a view showing database schemas and database objects that the query uses, a view showing queries per class, a view showing the queries used by each database object in the database, a view showing how the queries are run, a view for exporting data, and a view showing performance information of execution count and execution time for each of the queries.

9. A system, comprising:
a processor;
memory; and
circuitry to perform operations, the operations comprising:
setting, with a processor executing on a computer, one or more breakpoints in source code of a client application based on locations of Application Programming Interface (API) calls in the source code;
while running the client application through a debugger, upon reaching each of the one or more breakpoints,
identifying one or more debugger rules associated with a query at a breakpoint;
in response to determining that conditions of the one or more debugger rules are satisfied,
obtaining a stack trace before the query makes a call to a database;
deriving query text of the query and a location of the query in the source code of the client application;
parsing the query text to identify database objects used by the query; and
storing correlator results for the query that identify a source file of the client application, locations of an API call in the source code, parameters of the API call, and the database objects, wherein one of the parameters is the query text of the query; and
displaying user interface views in a user interface to present the correlator results for problem determination and where used analysis.

10. The system of claim 9, wherein the operations further comprise: in response to determining that conditions of the one or more debugger rules are not satisfied, continuing to run the client application through the debugger until another breakpoint is reached or execution of the client application is completed.

11. The system of claim 9, wherein the operations further comprise:
in response to deriving the query of the API call,
obtaining the query text of the query;
invoking a query parser to parse the query to identify one or more tables and one or more columns used by the query;
and
performing analysis using the correlator results.

12. The system of claim 11, wherein the operations further comprise:
retrieving the correlator results; and
generating the user interface views using the correlator results, wherein the user interface views provide at least one of: a view showing the query in the database and the query in the source code, a view showing database schemas and database objects that the query uses, a view showing queries per class, a view showing the queries used by each database object in the database, a view showing how the queries are run, a view for exporting data, and a view showing performance information of execution count and execution time for each of the queries.

* * * * *